US009672583B2

(12) United States Patent
Lin et al.

(10) Patent No.: US 9,672,583 B2
(45) Date of Patent: Jun. 6, 2017

(54) GPU ACCELERATED ADDRESS TRANSLATION FOR GRAPHICS VIRTUALIZATION

(75) Inventors: Yunbiao Ben Lin, ShangHai (CN); Jianghong Julie Du, ShangHai (CN)

(73) Assignee: Intel Corporation, Santa Clara, CA (US)

( * ) Notice: Subject to any disclaimer, the term of this patent is extended or adjusted under 35 U.S.C. 154(b) by 158 days.

(21) Appl. No.: 13/995,448

(22) PCT Filed: Dec. 21, 2011

(86) PCT No.: PCT/CN2011/084327
§ 371 (c)(1),
(2), (4) Date: Aug. 21, 2014

(87) PCT Pub. No.: WO2013/091185
PCT Pub. Date: Jun. 27, 2013

(65) Prior Publication Data
US 2014/0354667 A1 Dec. 4, 2014

(51) Int. Cl.
*G06T 1/60* (2006.01)
*G06F 12/1027* (2016.01)
(Continued)

(52) U.S. Cl.
CPC ............ *G06T 1/60* (2013.01); *G06F 9/45533* (2013.01); *G06F 12/1027* (2013.01); *G09G 5/363* (2013.01); *G09G 5/39* (2013.01)

(58) Field of Classification Search
None
See application file for complete search history.

(56) References Cited

U.S. PATENT DOCUMENTS

2003/0200413 A1 10/2003 Gurumoorthy et al.
2006/0139360 A1* 6/2006 Panesar ............... G06F 12/1081
345/568

(Continued)

FOREIGN PATENT DOCUMENTS

TW 388846 B 5/2000
TW 591603 B 6/2004

OTHER PUBLICATIONS

PCT/CN2011/084327 Notification of Transmittal of the International Search Report and the Written Opinion of the International Searching Authority, mailed Sep. 20, 2012, 11 pages.

(Continued)

*Primary Examiner* — Maurice L McDowell, Jr.
(74) *Attorney, Agent, or Firm* — Nicholson De Vos Webster & Elliott, LLP

(57) ABSTRACT

In accordance with embodiments disclosed herein, there are provided methods, systems, mechanisms, techniques, and apparatuses for implementing GPU (Graphics Processing Unit) accelerated address translation for graphics virtualization. In one embodiment, such a system includes a main memory having a plurality of machine physical addresses; a graphics processor unit having graphics memory therein; an address translation service integrated with the graphics processor unit; a hypervisor to manage one or more guest machines; wherein the hypervisor is to configure a lookup table within the graphics memory of the graphics processor unit; and further wherein the address translation service of the graphics processor unit is to translate a guest physical address for one of the one or more guest machines to a corresponding machine physical address within the main memory. Such a graphics processor unit may be implemented separate from a system, for example, embodied within a silicon integrated circuit.

30 Claims, 16 Drawing Sheets

(51) Int. Cl.
*G06F 9/455* (2006.01)
*G09G 5/36* (2006.01)
*G09G 5/39* (2006.01)

(56) References Cited

U.S. PATENT DOCUMENTS

| | | | |
|---|---|---|---|
| 2007/0052715 A1* | 3/2007 | Levit-Gurevich | G06T 1/60 345/542 |
| 2009/0187902 A1* | 7/2009 | Serebrin | G06F 9/455 718/1 |
| 2011/0231630 A1 | 9/2011 | Dannowski et al. | |
| 2011/0246171 A1* | 10/2011 | Cleeton | G06F 9/45558 703/25 |
| 2012/0159039 A1* | 6/2012 | Kegel | G06F 12/1009 711/6 |

OTHER PUBLICATIONS

PCT/CN2011/084327 Notification Concerning Transmittal of the International Preliminary Report on Patentability, mailed Jul. 3, 2014, 7 pages.
Office action and Search Report with summarized English translation from Taiwan Patent Application No. 101144471, mailed Aug. 1, 2014, 15 pages.
Notice of Allowance with English translation from Taiwan Patent Application No. 101144471, mailed Nov. 17, 2014, 3 pages.

\* cited by examiner

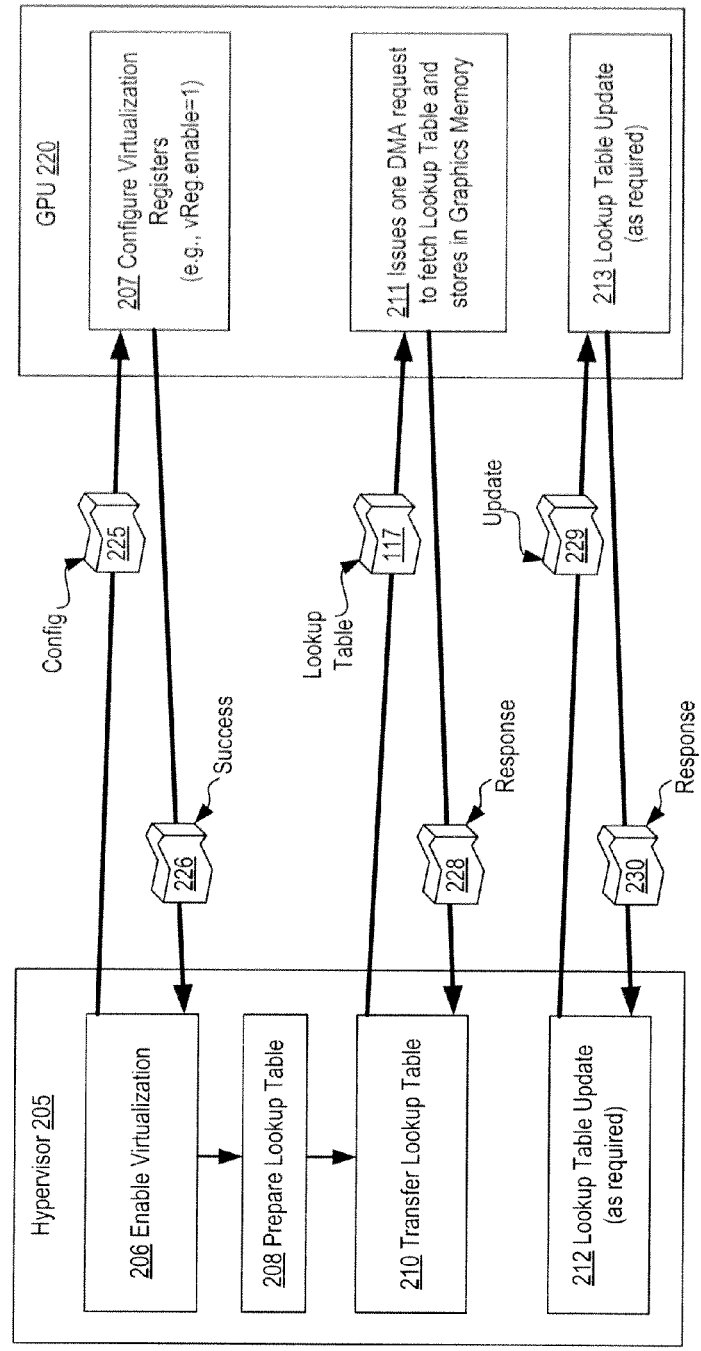

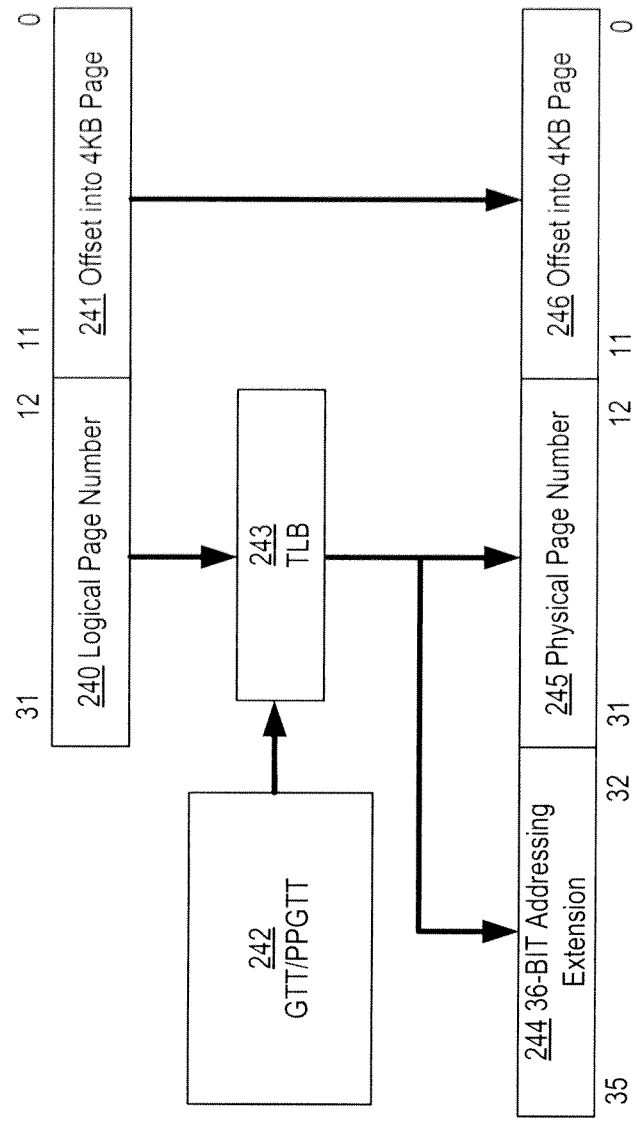

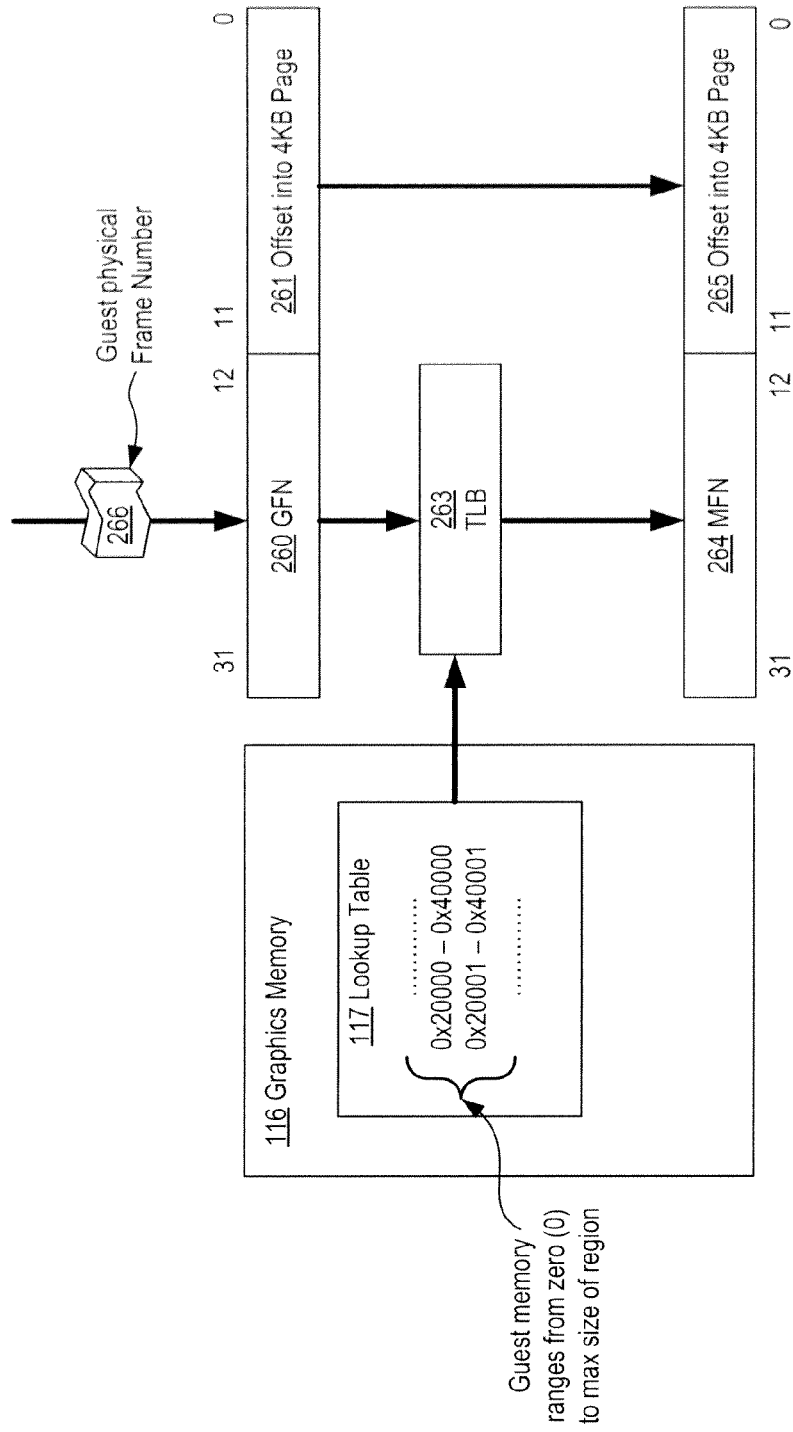

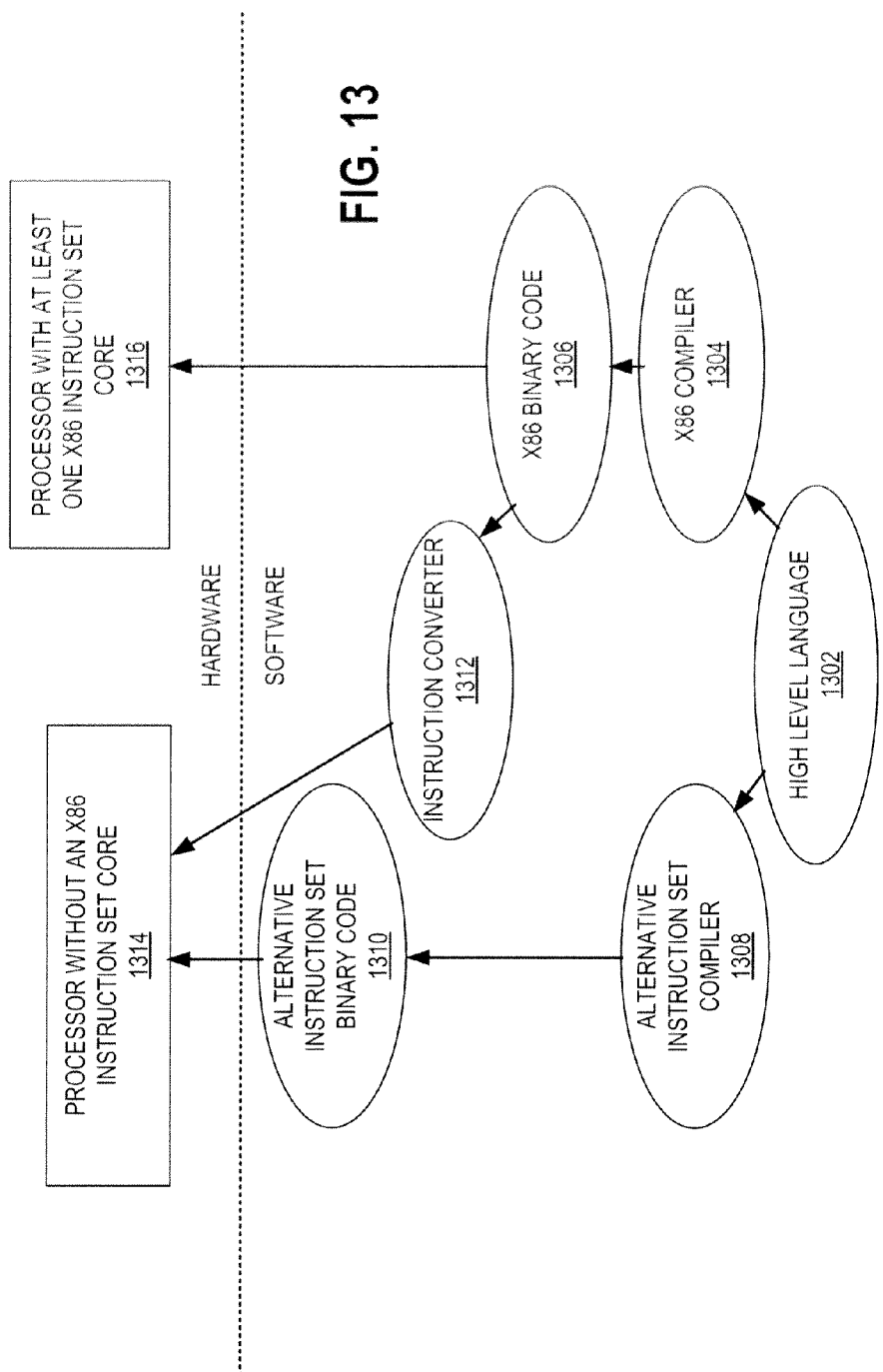

GPU ACCELERATED ADDRESS TRANSLATION FOR GRAPHICS VIRTUALIZATION

CROSS-REFERENCE TO RELATED APPLICATIONS

This patent application is a U.S. National Phase Application under 35 U.S.C. §371 of International Application No. PCT/CN2011/084327, filed Dec. 21, 2011, entitled GPU ACCELERATED ADDRESS TRANSLATION FOR GRAPHICS VIRTUALIZATION.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

TECHNICAL FIELD

The subject matter described herein relates generally to the field of computing, and more particularly, to systems and methods for implementing GPU (Graphics Processing Unit) accelerated address translation for graphics virtualization.

BACKGROUND

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also correspond to embodiments of the claimed subject matter.

A GPU or graphics processing unit provides special circuitry designed to rapidly manipulate and alter memory in such a way so as to accelerate the building of images in a frame buffer intended for output to a display. GPUs are used in embedded systems, mobile phones, personal computers, workstations, and game consoles and are very efficient at manipulating computer graphics, and their highly parallel structure makes them more effective than general-purpose CPUs for algorithms where processing of large blocks of data is done in parallel.

Virtualization provides the capability for multiple operating systems to simultaneously share processor resources in a secure and efficient manner. When implementing virtualization, it is necessary to translate addresses between a guest physical address of a virtualized guest machine (e.g., a virtual machine or a "VM") into the corresponding machine physical address of the underlying physical hardware upon which the resources for the guest machine are virtualized.

For example, when an operating system (OS) is running inside a virtual machine, the operating system does not usually know the corresponding machine physical addresses of memory that it accesses. Direct access to the computer hardware is therefore complicated because if the guest operating system attempts to instruct the underlying hardware to perform a direct memory access (DMA) using the virtual machine's guest-physical addresses the instruction would likely corrupt the memory as the underlying hardware is unaware of the mapping or required translation between the guest physical address and the machine physical address for the virtual machine. A hypervisor managing the virtual machine can prevent such corruption, but the problem of address translation nevertheless remains.

An input/output memory management unit (IOMMU) can solve the problem of translation by re-mapping the addresses accessed by the underlying hardware according to a translation table that is used to map guest physical addresses to machine physical addresses. IOMMU technology such as VT-d or "Virtualization Technology for Directed I/O" can be leveraged to provide the necessary translation capability on behalf of the virtual machine and the hypervisor when the requisite circuitry and chipset is available. VT-d is a type of an IOMMU may be included with some chipsets to accompany a CPU.

Unfortunately, not all chipsets include the IOMMU or VT-d technology. For example, some Atom based platforms, tablets, handheld smartphones, and notebook computers lack the necessary circuitry to provide a conventional VT-d capability.

Device drivers within virtual machines do not function properly without DMA address translation. Software solutions to perform address translation for DMA operations have been attempted, for example, implemented within a hypervisor. However, performance of software based address translation is very poor. For example, 3D performance has been measured to be approximately 40% of a native VT-d type solution. Worse yet, software based solutions were measured to contribute about 90% of the total overhead when software within a hypervisor was utilized to perform the address translation.

Such an inefficient use of resources is unacceptable with today's mobile computing devices which strive for energy efficiency over pure computational processing horsepower. A more efficient solution is therefore necessary.

The present state of the art may therefore benefit from systems and methods for implementing GPU (Graphics Processing Unit) accelerated address translation for graphics virtualization as described herein.

BRIEF DESCRIPTION OF THE DRAWINGS

Embodiments are illustrated by way of example, and not by way of limitation, and will be more fully understood with reference to the following detailed description when considered in connection with the figures in which:

FIG. 2A depicts interactions between a hypervisor and a GPU which implements address translation services in accordance with the disclosed embodiments;

FIG. 2B depicts logical memory address to guest physical address translation 201 in accordance with the disclosed embodiments;

FIG. 2C depicts Guest physical Frame Number (GFN) to Machine Frame Number (MFN) mapping in accordance with the disclosed embodiments;

FIG. 13 illustrates a system to translate instructions in accordance with one embodiment;

DETAILED DESCRIPTION

Figure 1A:
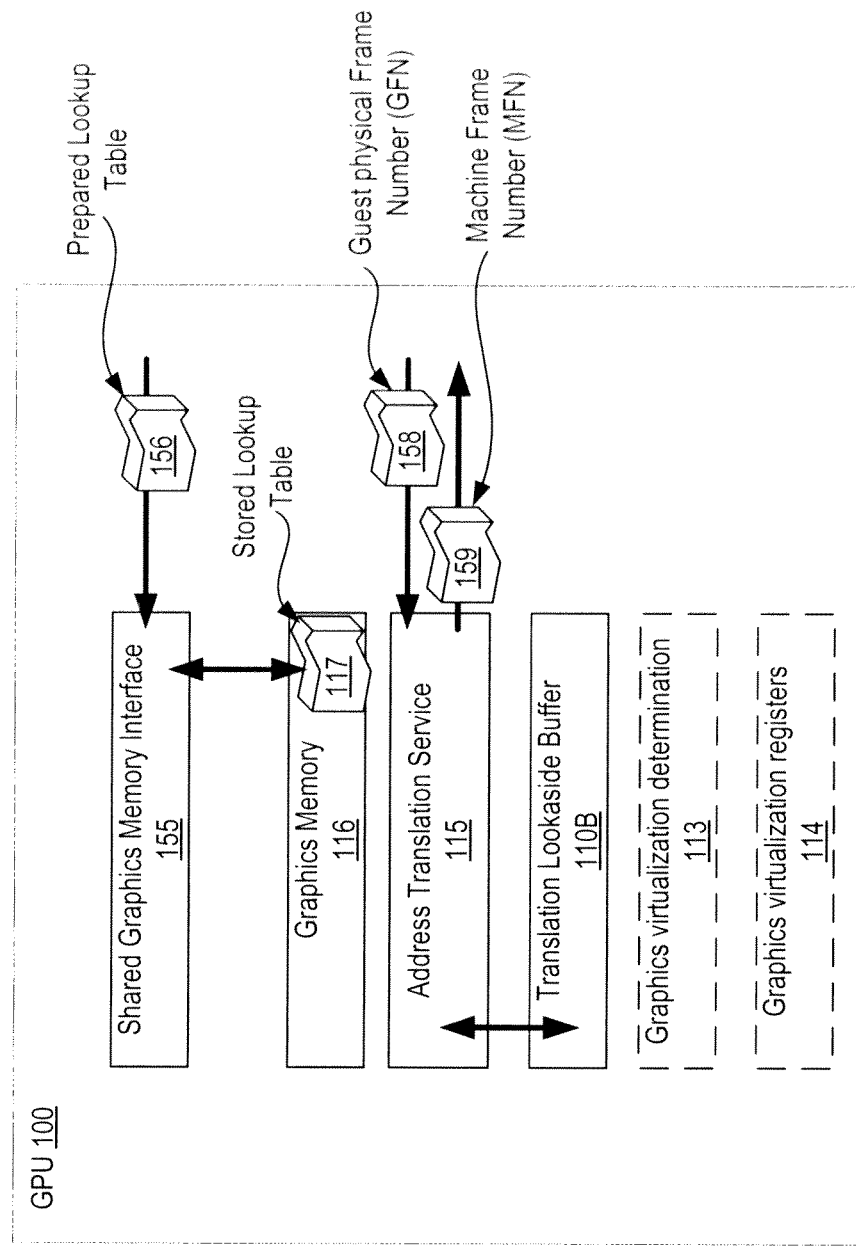
FIG. 1A illustrates an exemplary architecture of graphics processor unit (GPU) in accordance with which embodiments may operate.

Described herein are systems and methods for implementing GPU (Graphics Processing Unit) accelerated address translation for graphics virtualization. In one embodiment, such a system includes a main memory having a plurality of machine physical addresses; a graphics processor unit having graphics memory therein; an address translation service integrated with the graphics processor unit; a hypervisor to manage one or more guest machines; wherein the hypervisor is to configure a lookup table within the graphics memory of the graphics processor unit; and further wherein the address translation service of the graphics processor unit is to translate a guest physical address for one of the one or more guest machines to a corresponding machine physical address within the main memory. Such a graphics processor unit may be implemented separate from a system, for example, embodied within a silicon integrated circuit.

Practice of the disclosed embodiments provides an efficient and capable hardware based mechanism to implement necessary address translation when an IOMMU chipset, such as a VT-d capability is not available. Moreover, practice of the disclosed embodiments may be utilized even where an IOMMU chipset, such as a VT-d capability is available, as practice of the disclosed embodiments may yield improved results.

For example, in order to vastly reduce the address translation overhead associated with a software-centric solution, and to potentially reduce the overhead involved with an IOMMU chipset/VT-d based solution, the disclosed embodiments teach a GPU based address translation service (ATS) to offload address translation overhead from another entity directly onto the GPU.

Improved graphics performance may be realized in virtual machines through practice of the disclosed embodiments in which GPU based address translation is utilized for graphics pass-through in a non VT-d capable platform including a GPU Based Address Translation Services for PCI device pass-through, such as DMA address translation of GFN to MFN addresses (e.g., guest physical addresses to machine physical addresses). Graphics sharing among and between different virtual machines may additionally be implemented utilizing the disclosed embodiments.

Using an extension the GPU is enabled to perform translation of addresses in a virtualization mode, thus allowing the GPUs hardware to perform the translation without having to rely on inefficient software implementations and without the necessity for a dedicated IOMMU in the CPU such as VT-d capability or other special support from the CPU or chipset. For example, the VMM may program registers to tell the GPU to use a pass-through mode and the VMM then writes an address translation table into the GPU via the GPU's shared memory.

As the use of client virtualization becomes more commonplace, performance of such virtualized machines will remain a key challenge. Although VT-d has aided with performance on systems embodying the necessary CPU and chipset circuitry, the newer mobile computing devices such as tablets, net-books, and handheld smartphones very often do not incorporate VT-d capabilities, yet nevertheless make use of virtual machines. The VT-d capabilities are often dropped from designs to meet the demanding constraints of a small form factor mobile device and additionally due to the emphasis placed upon energy efficiency which translates directly to extended battery life.

Practice of the disclosed embodiments may therefore enable efficient small form-factor devices such as tablets and smartphones to nevertheless support GPU based address translation services so as to provide a high-performance solution in the absence of VT-d capabilities and without having to resort to inefficient software solutions.

Further still, practice of the disclosed embodiments requires no special support or modification to the graphics driver stack and may achieve similar or better performance when compared with VT-d solutions.

The following definitions are provided for acronyms used throughout the disclosure that follows:

GFN: Guest physical Frame Number. For example, addresses the Guest or virtual machine thinks are hardware addresses being used in guest page tables.

MFN: Machine Frame Number. For example, the Actual hardware addresses in the underlying hardware.

VM: Virtual Machine or Guest Machine.

VMM: A Virtual Machine Monitor or Hypervisor for VMs or Guest Machines.

GTT: Graphics Translation Table for virtual memory.

GGTT: Global Graphics Translation Table. For example, a single common translation table used for all processes.

PPGTT: Per-Process Graphics Translation Table.

DMA: Direct Memory Access. For example, a memory address which is not facilitated by a host operating system.

GPU: Graphics Processing Unit.

IOMMU: Input/Output Memory Management Unit.

VT-d: "Virtualization Technology for Directed I/O" which is an implementation of an IOMMU in some CPUs.

TLB: Translation Lookaside Buffer.

ATS: Address Translation Service.

In the following description, numerous specific details are set forth such as examples of specific systems, languages, components, etc., in order to provide a thorough understanding of the various embodiments. It will be apparent, however, to one skilled in the art that these specific details need not be employed to practice the disclosed embodiments. In other instances, well known materials or methods have not been described in detail in order to avoid unnecessarily obscuring the disclosed embodiments.

In addition to various hardware components depicted in the figures and described herein, embodiments further include various operations which are described below. The operations described in accordance with such embodiments may be performed by hardware components or may be embodied in machine-executable instructions, which may be used to cause a general-purpose or special-purpose processor programmed with the instructions to perform the operations. Alternatively, the operations may be performed by a combination of hardware and software, including software instructions that perform the operations described herein via memory and one or more processors of a computing platform.

Embodiments also relate to a system or apparatus for performing the operations herein. The disclosed system or apparatus may be specially constructed for the required purposes, or it may comprise a general purpose computer selectively activated or reconfigured by a computer program stored in the computer. Such a computer program may be stored in a non-transitory computer readable storage medium, such as, but not limited to, any type of disk including floppy disks, optical disks, flash, NAND, solid state drives (SSDs), CD-ROMs, and magnetic-optical disks, read-only memories (ROMs), random access memories (RAMs), EPROMs, EEPROMs, magnetic or optical cards, or any type of media suitable for storing non-transitory electronic instructions, each coupled to a computer system bus. In one embodiment, a non-transitory computer readable storage medium having instructions stored thereon, causes one or more processors within a system to perform the methods and operations which are described herein. In another embodiment, the instructions to perform such methods and operations are stored upon a non-transitory computer readable medium for later execution.

The algorithms and displays presented herein are not inherently related to any particular computer or other apparatus nor are embodiments described with reference to any particular programming language. It will be appreciated that a variety of programming languages may be used to implement the teachings of the embodiments as described herein.

FIG. 1A illustrates an exemplary architecture of graphics processor unit (GPU) 100 in accordance with which embodiments may operate.

In one embodiment, the graphics processor unit 100 is embodied within a silicon integrated circuit. In one embodiment, the graphics processor unit 100 includes a shared graphics memory interface 155 to receive a prepared lookup table 156 from a hypervisor and a graphics memory 116 to store the prepared lookup table 156 therein as a stored lookup table 117. In such an embodiment, the prepared lookup table 156 provides a mapping of Guest physical Frame Numbers (GFNs) 158 to Machine Frame Numbers (MFNs) 159.

In one embodiment, the graphics processor unit 100 further includes an address translation service 115 unit to receive a Guest physical Frame Number for translation. In one embodiment, the graphics processor unit 100 includes and utilizes a Translation Lookaside Buffer (TLB) 110B to retrieve a Machine Frame Number corresponding to the received Guest physical Frame Number from the prepared lookup table 156 to fulfill the translation. The address translation service 115 may retrieve the GFN to MFN mappings through the Translation Lookaside Buffer 110B integrated within the graphics processor unit 100. In one embodiment, the TLB provides an indexable cache on behalf of the address translation service 115 of the graphics processor unit 100.

In one embodiment, the graphics processor unit 100 performs address translation services 115 on behalf of one or more guest machines operating within a tablet computing device or a smartphone.

In one embodiment, the graphics processor unit 100 further includes one or more graphics virtualization registers 114. For example, the one or more graphics virtualization registers 114 may inform the graphics processor unit 100 that a guest machine has been assigned to the graphics processor unit 100 by a hypervisor. The one or more graphics virtualization registers 114 may further identify where the prepared lookup table 156 is stored in the graphics memory 116 as a stored lookup table 117. For example, the one or more graphics virtualization registers 114 may identify where the lookup table 117 is located for an assigned guest machine.

In one embodiment, the graphics processor unit 100 further includes a graphics virtualization determination 113 component integrated therein. For example, the graphics virtualization determination 113 component may determine whether or not the graphics processor unit 100 is operating within a virtualization environment on behalf of one or more guest machines. In one embodiment, the graphics processor unit 100 engages the address translation service 115 when operating within the virtualization environment as determined by the graphics virtualization determination 113 component, but otherwise, address translation service 115 is bypassed.

Figure 1B:
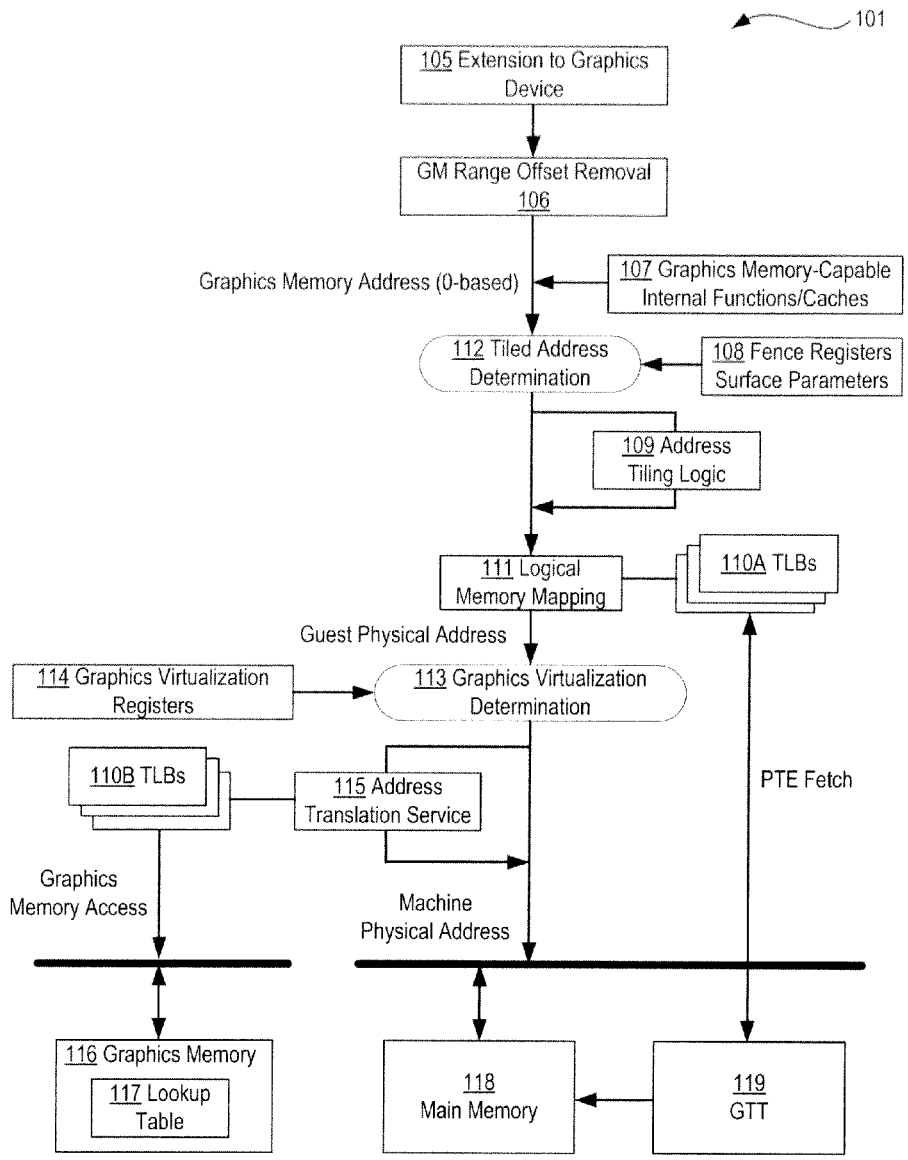
FIG. 1B illustrates an alternative exemplary architecture in which embodiments may operate.

FIG. 1B illustrates an alternative exemplary architecture 101 in which embodiments may operate. The newly introduced GPU based address translation service (ATS) extends the existing logical-to-physical mapping of the GPU to support translating a guest physical address to a corresponding machine physical address.

As depicted, an extension to the graphics device 105 is provided which feeds into the graphics memory (GM) offset removal 106 component. As shown, the graphics memory addresses are zero ("0") based, which is they begin at zero and proceed to a maximum allocated region or space. Graphics memory-capable internal functions and cache 107 is depicted as being communicably interfaced between the GM range offset removal 106 component and the tiled address determination 112 component. Fence registers surface parameters 108 feeds into the tiled address determination 112 component which in turn is communicably interfaced to the logical memory mapping component 111. Intermediately interfaced is the address tiling logic 109.

Graphics virtualization registers 114 feeds into the graphics virtualization determination 113 component which in turn is communicably interfaced with the address translation service (ATS) noted above. Graphics virtualization registers 114 are used to let the GPU know whether the graphics adapter has been assigned to a VM and to inform it as to where the lookup table is located. The graphics virtualization determination 113 component is used to determine whether the graphics adapter is working in virtualization environment. If the graphics adapter works in virtualization environment it will call address translation service 115 to convert the guest physical address to a machine physical address. The address translation service 115 retrieves the machine physical address from the lookup table according to the guest physical address.

Translation lookaside buffers (TLBs) 110B are communicably interfaced with both the address translation service 115 and also the lookup table 117 within the graphics memory 116 of the depicted architecture 101. In accordance with one embodiment, the lookup table 117 is configured by a hypervisor communicably interfaced with the architecture 101 of the GPU and can cover zero to four gigabytes of guest memory space. The lookup table 117 maps the GFN (Guest Physical frame number) to MFN (Machine Frame Number).

Translation lookaside buffers (TLBs) 110B perform a graphics memory access on behalf of the address translation service 115. A translation lookaside buffer or TLB as depicted at 110A and 110B is a processor cache used to improve virtual address translation speed. TLBs 110A and 110B may be implemented as content-addressable memory (CAM) in which the CAM search key is the virtual address and the search result is a physical address, thus yielding the desired GFN to MFN addresses translation (e.g., a guest physical address to a machine physical address) in accordance with one embodiment.

Where the requested address is present in the TLB 110A or 110B, the CAM search yields a match quickly and the retrieved physical address can be used to access memory, for example, the returned machine physical address may then be utilized to access a physical address of the underlying hardware, despite the original instruction providing a virtualized address associated with a guest physical address. Alternatively, the address translation service 115 may conduct a page walk where necessary or compute the address when feasible.

Once translated by the address translation service 115, a machine physical address may be utilized to access main memory 118. Main memory 118 is in communication with global translation table (GTT) 119 which is in turn communicably interfaced with TLBs at 110A, for example, responsive to a PTE fetch operation (e.g., a Page Table Entries fetch operation).

FIG. 2A depicts interactions 200 between a hypervisor 205 and a GPU 220 which implements address translation services in accordance with the disclosed embodiments.

Graphics adapter pass-through is depicted in which a GPU is used to perform address translation for the graphics pass-through. Practice of such an embodiment may boost the overall graphics performance for virtual machines in a non VT-d supported platform. In particular, a lookup table to perform address translation within the GPU is used resulting in faster performance over VT-d based solutions and in vastly superior performance over software based solutions.

The depicted interactions 200 show how to set-up lookup table in graphics adapter in accordance with one embodiment. For example, when a user wants to assign physical graphics adapter to a virtual machine, the hypervisor 205 will issue one set up lookup table session to transfer an entire 4 k aligned Guest-to-physical address mapping to the GPU 220.

In an IA32 architecture based machine, 1M*4 memory space (e.g., 4 megabytes) is large enough to cover an entire 4G (4 gigabytes) of guest memory space. Using the lookup table 117, the GPU 220 may calculate the final machine address using the following formula:

MFN=*((unsigned int*)(pPhysicalGraphicsMemory+ (GFN<<2)))

Beginning from the hypervisor 205 on the left hand side, enable virtualization at block 206 is initiated which communicates a configuration 225 to the GPU 220. The GPU 220 on the right hand side configures virtualization registers at block 207 (e.g., passing the configuration 225 to set "vReg.enable=1") and a success 226 message is responsively communicated from GPU 220 to hypervisor 205.

The hypervisor 205 then prepares the lookup table at block 208. The hypervisor 205 at block 210 transfers the lookup table 117 to the GPU 220. The GPU 220 at block 211 issues one DMA request to fetch the lookup table 117 and stores the lookup table 117 in graphics memory. Upon successful completion, the GPU 220 communicates a response 228 back to hypervisor 205 indicating completion.

Many hypervisors support advanced memory management mechanisms Implementation of the disclosed embodiments provides support for a lookup table update transaction. Graphics sharing among VMs is also supported by distinguishing among the virtual machines within the lookup table 117.

At block 212 the hypervisor 205 initiates a lookup table update (as required) and communicates the update 229 to the GPU 220. At block 213, the GPU 220 performs the lookup table update (as required) responsive to receiving the update 229. The GPU 220 then communicates a response 230 back to the hypervisor 205 indicating completion of the lookup table update.

FIG. 2B depicts logical memory address to guest physical address translation 201 in accordance with the disclosed embodiments. As noted above, overhead in a software based address translation service has been found to be significant (e.g., approximately 90% of total overhead) and performance suffers dramatically (e.g., a 3D graphics rendering was found to be approximately 40% the performance of a native hardware solution). Thus, practice of the disclosed embodiments may offload overhead from a software based solution onto a GPU which implements address translation services. In accordance with one embodiment, address translation may utilize two distinct mechanisms.

In one embodiment, a first mechanism is translation of logical memory addresses to guest physical addresses. Legacy mechanisms may be utilized to achieve this translation. For example, if the GPU is not in a virtualization environment, it may skip the GPU's address translation service and access the main memory using MFN=GFN. However, if the GPU is operating in a virtualization environment, then the GPU's address translation service is called to perform an address translation according to the formula:

MFN=*((unsigned int*)(pPhysicalGraphicsMemory+ (GFN<<2)))

As depicted, an offset into a 4 KB page 241 is provided at bits 0 to 11 and a logical page number 240 is provided at bits 12 to 31. The logical page number 240 is communicated to TLB 243 which is interfaced with GTT/PPGTT 242 (e.g., global translation table and per-process global translation table). From TLB 243 the 36-bit addressing extension 244 is formed at bits 32 to 35 and the physical page number 245 is formed at bits 12 to 31 replacing the logical page number 240. The offset into a 4 KB page 246 is carried down replacing offset into a 4 KB page 241 at bits 0 to 11, and thus completing the logical memory address to guest physical address translation 201.

Extra cache operations may additionally be utilized to accelerate the address translation operation.

Notably, the address translation service of the GPU need not be engaged as the lack of a virtualization environment negates the need for performing GFN to MFN mapping.

FIG. 2C depicts Guest physical Frame Number (GFN) to Machine Frame Number (MFN) mapping 202 in accordance with the disclosed embodiments. For example, where the GPU is operating in a virtualization environment.

As depicted, graphics memory 116 of a GPU holds the lookup table 117 in which the guest memory ranges from zero (0) to a maximum size of an allocated region. A guest physical frame number 266 is passed in resulting in GFN

260 at bits 12 to 31. An offset into a 4 KB page 261 is again depicted at bits 0 to 11. GFN 260 is passed to TLB 263 which is communicably interfaced with the lookup table 117 in the graphics memory 116. MFN 264 is then responsively provided as set forth at bits 12 to 31 and an offset into a 4 KB page 265 is carried down replacing offset into a 4 KB page 264 at bits 0 to 11, and thus completing the GFN to MFN mapping 202.

Figure 3:
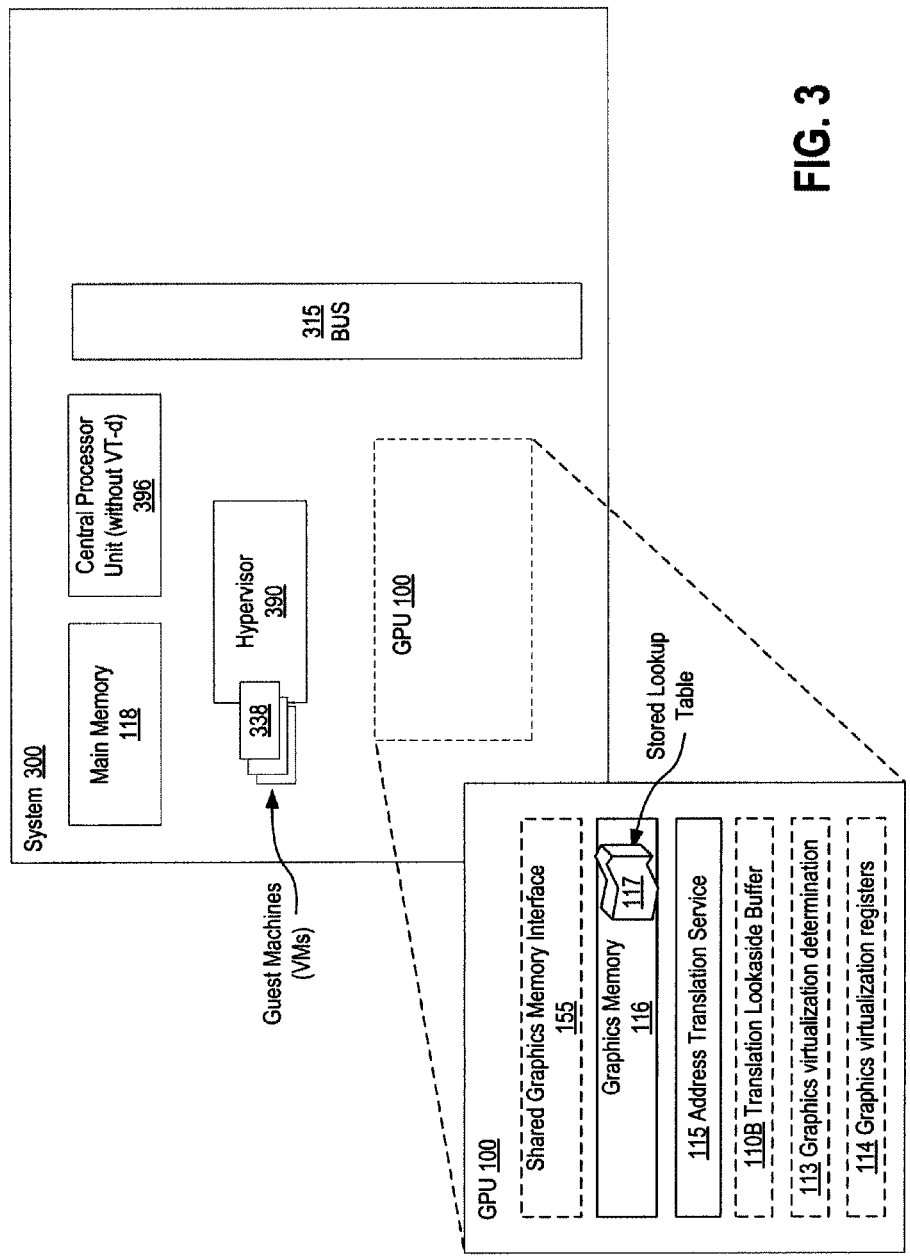
FIG. 3 illustrates an exemplary system into which a graphics processor unit which implements address translation services may be integrated, installed, or configured, in accordance with one embodiment.

FIG. 3 illustrates an exemplary system 300 into which a graphics processor unit 100 which implements address translation services 115 may be integrated, installed, or configured, in accordance with one embodiment. System 300 includes a main memory 118 and a central processor unit 396 without VT-d integrated therein. System 300 includes communication bus(es) 315 to transfer data within system 300 and a hypervisor 390 to manage one or more guest machines (VMs) 338.

Depicted separately is graphics processor unit (GPU) 100 which may be manufactured and sold separate from the system 300 but later configured and integrated with such a system 300. In accordance with one embodiment, such a system includes: main memory 118 having a plurality of machine physical addresses; the graphics processor unit 100 having graphics memory 116 therein; an address translation service 115 integrated with the graphics processor unit 100; and the hypervisor 390 to manage one or more guest machines 338. In such an embodiment, the hypervisor 390 configures a lookup table 117 within the graphics memory 116 of the graphics processor unit 100. In such an embodiment, the address translation service 115 of the graphics processor unit 100 translates a guest physical address for one of the one or more guest machines 338 to a corresponding machine physical address within the main memory 118 of the system.

In one embodiment, such a system 300 further includes one or more graphics virtualization registers 114 within the GPU 100, in which one or more graphics virtualization registers 114 inform the graphics processor unit 100 that one of the guest machines 338 has been assigned to the graphics processor unit 100 by the hypervisor 390. Such a system 300 may further include a graphics virtualization determination 113 component integrated within the graphics processor unit 100 to determine whether or not the graphics processor unit 100 is operating within a virtualization environment on behalf of one of the guest machines 338. When operating within the virtualization environment the address translation service 115 is engaged as set forth above in FIG. 2C depicting Guest physical Frame Number (GFN) to Machine Frame Number (MFN) mapping 202. However, when not operating within the virtualization environment, the system 300 implements logical memory address to guest physical address translation without engaging the address translation service 115 of the graphics processor unit 100, as set forth above in FIG. 2B depicting logical memory address to guest physical address translation 201.

In one embodiment, the hypervisor 390 engages the address translation service 115 of the graphics processor unit 100 by configuring one or more graphics virtualization registers 114 to inform the graphics processor unit 100 that one of the guest machines 338 have been assigned to the graphics processor unit 100 by the hypervisor 390. The hypervisor 390 may include or be implemented via a virtual machine manager and the one or more guest machines 338 may include or be implemented via one or more virtual machines.

In one embodiment, the hypervisor 390 passes a Guest physical Frame Number (GFN) to the graphics processor unit 100 for translation by the address translation service 115 to a Machine Frame Number (MFN). In such an embodiment, the GFN represents the guest physical address for one of the one or more guest machines 338 and the MFN represents the machine physical addresses within the main memory 118 of the system, corresponding to the guest physical address. In one embodiment, the address translation service 115 retrieves Guest physical Frame Number (GFN) to Machine Frame Number (MFN) mappings from the lookup table 117 in the graphics memory 116.

In one embodiment, the system 300 includes a separate and distinct central processor unit 396 communicably interfaced with the graphics processor unit 100 via a system bus 315. In such an embodiment, the central processing unit lacks dedicated hardware circuitry to perform address translation of guest physical addresses to machine physical addresses and is thus forced to either rely upon the GPU's 100 address translation services 115 or perform inefficient software translation in the absence of a GPU 100 as is described herein.

In one embodiment, the system 300 utilizes the graphics processor unit 100 as a microprocessor within a tablet computing device or a smart phone or one of a plurality of microprocessors integrated within the tablet computing device or the smartphone. For example, such a tablet computing device or smartphone may include the central processor unit 396 which lacks an IOMMU or VT-d capability.

In one embodiment, the graphics memory 116 includes shared graphics memory 116; and the hypervisor 390 configures the lookup table 117 within the graphics memory by writing lookup table 117 directly into the shared graphics memory 116 of the graphics processor unit 100, for example, via a shared graphics memory interface 155. In an alternative embodiment, the hypervisor 390 configures the lookup table 117 within the graphics memory 116 by instructing the graphics processor unit 100 to retrieve and store the lookup table 117 and the graphics processor unit 100 responsively issues a Direct Memory Access (DMA) request to fetch the lookup table 117 and then proceeds to store the lookup table 117 in the graphics memory 116.

In one embodiment, the hypervisor 390 issues a lookup table update to the graphics processor unit 100 and the graphics processor unit 100 responsively updates the lookup table 117 in the graphics memory 116.

Figure 4:
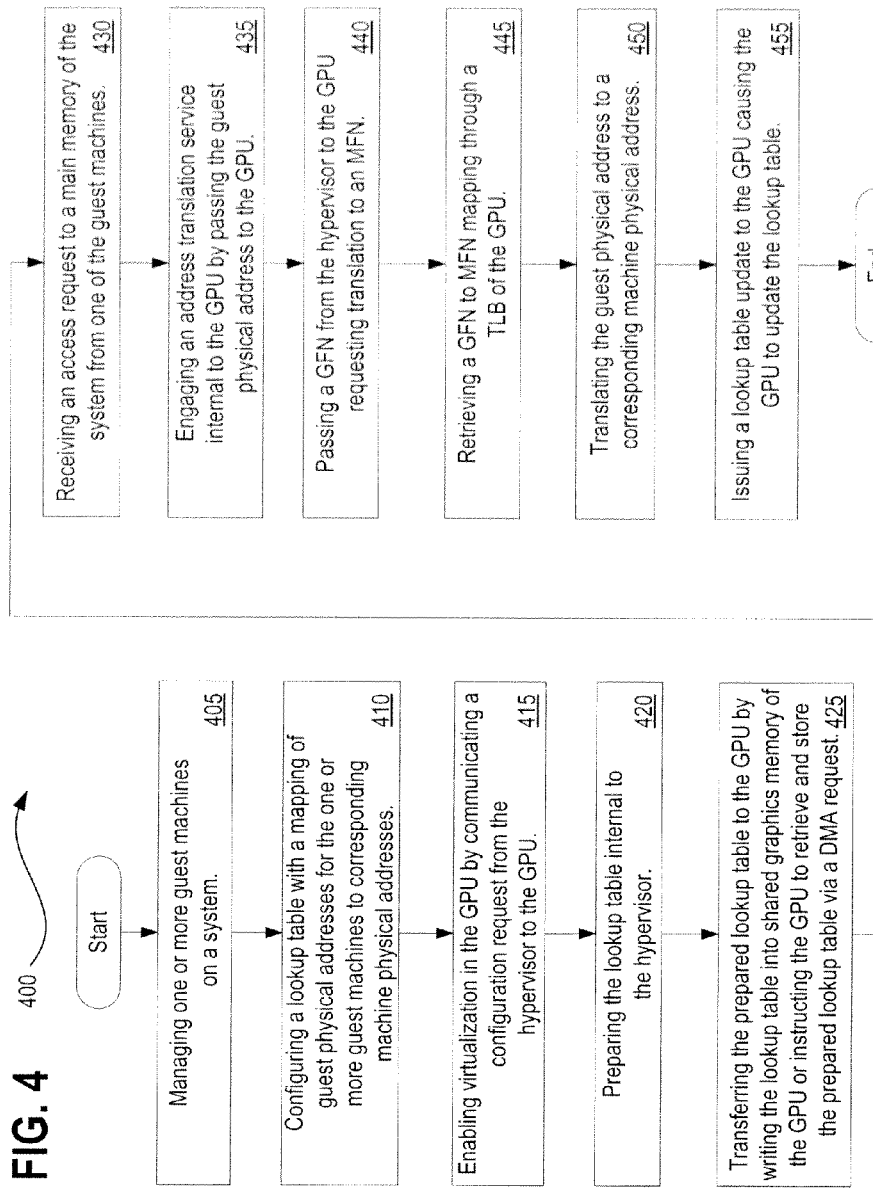
FIG. 4 is a flow diagram illustrating a method for implementing GPU (Graphics Processing Unit) accelerated address translation for graphics virtualization in accordance with described embodiments.

FIG. 4 is a flow diagram 400 illustrating a method for implementing GPU (Graphics Processing Unit) accelerated address translation for graphics virtualization in accordance with described embodiments. Method 400 may be performed by processing logic that may include hardware (e.g., circuitry, dedicated logic, programmable logic, microcode, etc.), software (e.g., instructions run on a processing device to perform the methodologies and operations described herein. Some of the blocks and/or operations of method 400 are optional in accordance with certain embodiments. The numbering of the blocks presented is for the sake of clarity and is not intended to prescribe an order of operations in which the various blocks must occur.

Method 400 begins with processing logic managing one or more guest machines on a system (block 405).

At block 410, processing logic configures a lookup table with a mapping of guest physical addresses for the one or more guest machines to corresponding machine physical addresses.

At block 415, processing logic enables virtualization in the GPU by communicating a configuration request from the hypervisor to the GPU.

At block 420, processing logic internal to the hypervisor prepares the lookup table.

At block 425, processing logic transfers the prepared lookup table to the GPU by writing the lookup table into shared graphics memory of the GPU or instructing the GPU to retrieve and store the prepared lookup table via a DMA request.

At block 430, processing logic receives an access request to a main memory of the system from one of the guest machines.

At block 435, processing logic engages an address translation service internal to the GPU by passing the guest physical address to the GPU.

At block 440, processing logic passes a GFN from the hypervisor to the GPU requesting translation to an MFN.

At block 445, processing logic retrieves a GFN to MFN mapping through a Translation Lookaside Buffer of the GPU.

At block 450, processing logic translates the guest physical address to a corresponding machine physical address (e.g., the GPU performs the requested GFN to MFN translation).

At block 455, processing logic issues a lookup table update to the GPU causing the GPU to update the lookup table.

In accordance with one embodiment, a non-transitory computer readable storage medium stores instructions that, when executed by processors (e.g., such as a CPU and also a GPU) in a computing system, the instructions cause the computing system to perform one or more of the operations set forth in the flow diagram 400. For example, instructions may cause the processors of the system to perform operations including: managing, via a hypervisor, one or more guest machines on a system; configuring a lookup table with a mapping of guest physical addresses for the one or more guest machines to corresponding machine physical addresses; transferring the lookup table to a graphics memory of a graphics processor unit; receiving an access request to a main memory of the system from one of the guest machines. In one embodiment, the access request specifies a guest physical address; engaging an address translation service internal to the graphics processor unit by passing the guest physical address to the graphics processor unit and translating, via the address translation service of the graphics processor unit, the guest physical address to a corresponding machine physical address.

Figure 5:
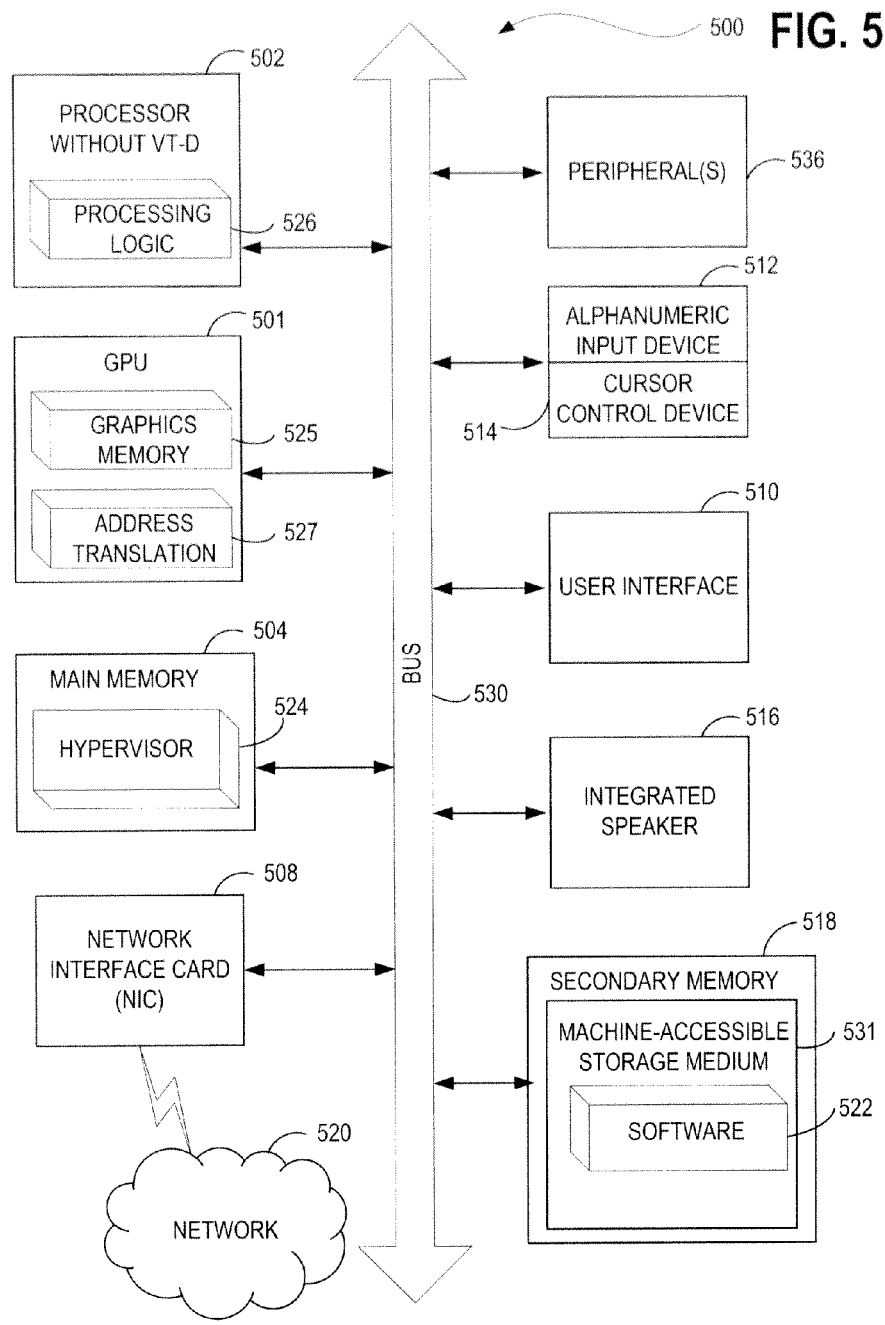
FIG. 5 illustrates a diagrammatic representation of a machine in the exemplary form of a computer system, in accordance with one embodiment.

FIG. 5 illustrates a diagrammatic representation of a machine 500 in the exemplary form of a computer system, in accordance with one embodiment, within which a set of instructions, for causing the machine/computer system 500 to perform any one or more of the methodologies discussed herein, may be executed. In alternative embodiments, the machine may be connected (e.g., networked) to other machines in a Local Area Network (LAN), an intranet, an extranet, or the Internet. The machine may operate in the capacity of a server or a client machine in a client-server network environment, as a peer machine in a peer-to-peer (or distributed) network environment, as a server or series of servers within an on-demand service environment. Certain embodiments of the machine may be in the form of a personal computer (PC), a tablet PC, a smart phone, a set-top box (STB), a Personal Digital Assistant (PDA), a cellular telephone, a web appliance, a server, a network router, switch or bridge, computing system, or any machine capable of executing a set of instructions (sequential or otherwise) that specify actions to be taken by that machine. Further, while only a single machine is illustrated, the term "machine" shall also be taken to include any collection of machines (e.g., computers) that individually or jointly execute a set (or multiple sets) of instructions to perform any one or more of the methodologies discussed herein.

The exemplary computer system 500 includes a processor 502 without VT-d, a main memory 504 (e.g., read-only memory (ROM), flash memory, dynamic random access memory (DRAM) such as synchronous DRAM (SDRAM) or Rambus DRAM (RDRAM), etc., static memory such as flash memory, static random access memory (SRAM), volatile but high-data rate RAM, etc.), and a secondary memory 518 (e.g., a persistent storage device including hard disk drives), which communicate with each other via a bus 530. Main memory 504 includes a hypervisor 524 to manage virtual machines which utilize GPU 501 and processor 502. Processor 502 operates in conjunction with the processing logic 526 to perform the methodologies discussed herein. In one embodiment GPU 501 utilizes a graphics memory 525 and address translation 527, each internal GPU 501.

The computer system 500 may further include a network interface card 508. The computer system 500 also may include a user interface 510 (such as a video display unit, a liquid crystal display (LCD), or a cathode ray tube (CRT)), an alphanumeric input device 512 (e.g., a keyboard), a cursor control device 514 (e.g., a mouse), and a signal generation device 516 (e.g., an integrated speaker). The computer system 500 may further include peripheral 536 devices (e.g., wireless or wired communication devices, memory devices, storage devices, audio processing devices, video processing devices, etc.).

The secondary memory 518 may include a non-transitory machine-readable or computer readable storage medium 531 on which is stored one or more sets of instructions (e.g., software 522) embodying any one or more of the methodologies or functions described herein. The software 522 may also reside, completely or at least partially, within the main memory 504 and/or within the processor 502 without VT-d and/or GPU 501 during execution thereof by the computer system 500. The software 522 may further be transmitted or received over a network 520 via the network interface card 508.

Figure 6:
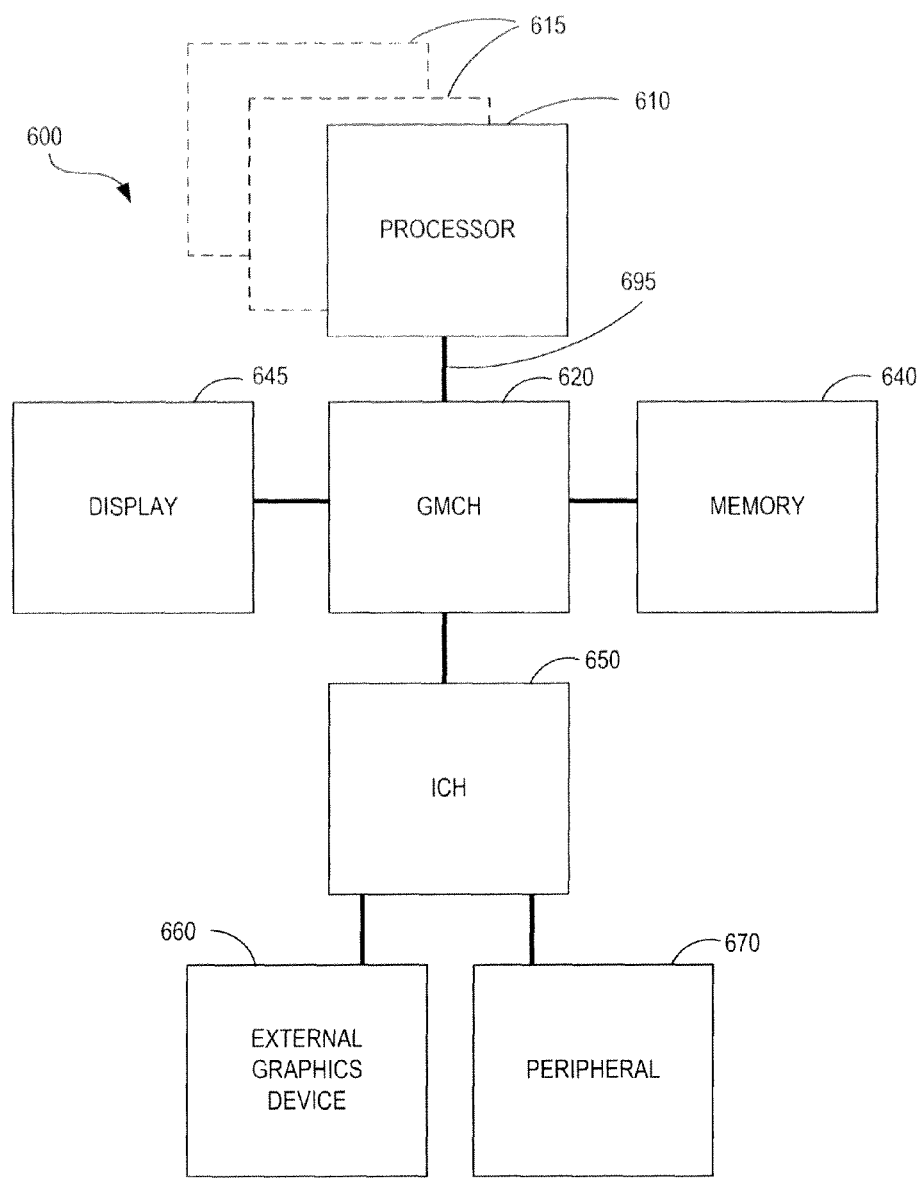
FIG. 6 depicts a block diagram of a system in accordance with one embodiment.

FIG. 6 depicts a block diagram of a system 600 in accordance with one embodiment. The system 600 may include one or more processors 610, 615, which are coupled to graphics memory controller hub (GMCH) 620. The optional nature of additional processors 615 is denoted in FIG. 6 with broken lines.

Each processor 610, 615 may be some version of the processor 502. However, it should be noted that it is unlikely that integrated graphics logic and integrated memory control units would exist in the processors 610, 615. FIG. 6 illustrates that the GMCH 620 may be coupled to a memory 640 that may be, for example, a dynamic random access memory (DRAM). The DRAM may, for at least one embodiment, be associated with a non-volatile cache.

The GMCH 620 may be a chipset, or a portion of a chipset. The GMCH 620 may communicate with the processor(s) 610, 615 and control interaction between the processor(s) 610, 615 and memory 640. The GMCH 620 may also act as an accelerated bus interface between the processor(s) 610, 615 and other elements of the system 600. For at least one embodiment, the GMCH 620 communicates with the processor(s) 610, 615 via a multi-drop bus, such as a frontside bus (FSB) 695.

Furthermore, GMCH 620 is coupled to a display 645 (such as a flat panel or touchscreen display). GMCH 620 may include an integrated graphics accelerator. GMCH 620 is further coupled to an input/output (I/O) controller hub (ICH) 650, which may be used to couple various peripheral devices to system 600. Shown for example in the embodiment of FIG. 6 is an external graphics device 660, which may be a discrete graphics device coupled to ICH 650, along with another peripheral device 670.

Alternatively, additional or different processors may also be present in the system 600. For example, additional processor(s) 615 may include additional processors(s) that are the same as processor 610, additional processor(s) that are heterogeneous or asymmetric to processor 610, accelerators (such as, e.g., graphics accelerators or digital signal processing (DSP) units), field programmable gate arrays, or any other processor. There can be a variety of differences between the physical resources of processors 610, 615 in terms of a spectrum of metrics of merit including architectural, micro-architectural, thermal, power consumption characteristics, and the like. These differences may effectively manifest themselves as asymmetry and heterogeneity amongst the processors 610, 615. For at least one embodiment, the various processors 610, 615 may reside in the same die package.

Figure 7:
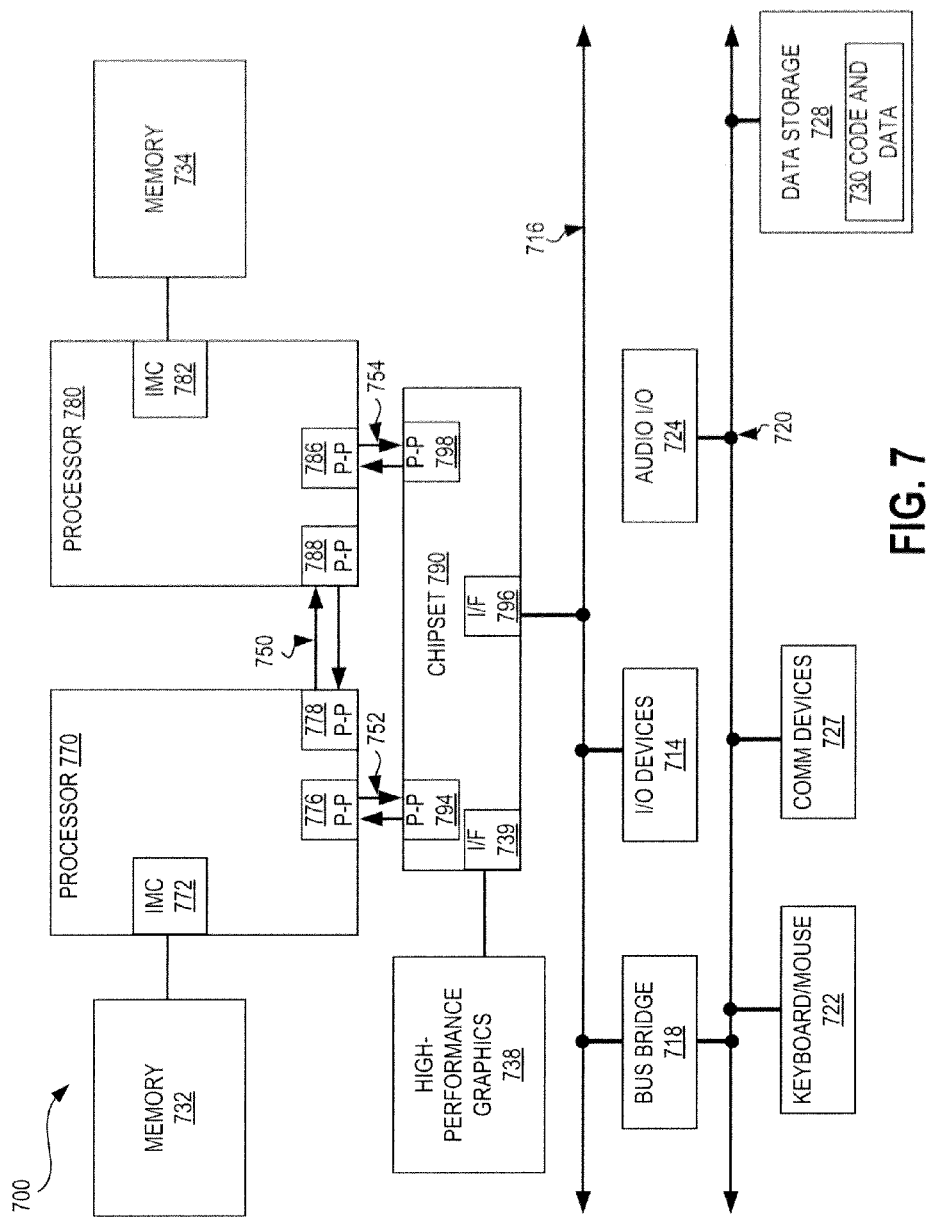
FIG. 7 is a block diagram of a computer system in accordance with one embodiment.

FIG. 7 is a block diagram of a computer system 700 in accordance with one embodiment. In particular, a block diagram of a second system 700 is depicted in accordance with an embodiment in which multiprocessor system 700 is a point-to-point interconnect system, and includes a first processor 770 and a second processor 780 coupled via a point-to-point interconnect 750. Each of processors 770 and 780 may be some version of GPU 501 and/or processor 502 or as one or more of the processors 610, 615.

While shown with only two processors 770, 780, it is to be understood that the scope of the present disclosure is not so limited. In other embodiments, one or more additional processors may be present in a given processor.

Processors 770 and 780 are shown including integrated memory controller units 772 and 782, respectively. Processor 770 also includes as part of its bus controller units point-to-point (P-P) interfaces 776 and 778; similarly, second processor 780 includes P-P interfaces 786 and 788. Processors 770, 780 may exchange information via a point-to-point (P-P) interface 750 using P-P interface circuits 778, 788. As shown in FIG. 7, IMCs 772 and 782 couple the processors to respective memories, namely a memory 732 and a memory 734, which may be portions of main memory locally attached to the respective processors.

Processors 770, 780 may each exchange information with a chipset 790 via individual P-P interfaces 752, 754 using point to point interface circuits 776, 794, 786, 798. Chipset 790 may also exchange information with a high-performance graphics circuit 738 via a high-performance graphics interface 739.

A shared cache (not shown) may be included in either processor or outside of both processors, yet connected with the processors via P-P interconnect, such that either or both processors' local cache information may be stored in the shared cache if a processor is placed into a low power mode.

Chipset 790 may be coupled to a first bus 716 via an interface 796. In one embodiment, first bus 716 may be a Peripheral Component Interconnect (PCI) bus, or a bus such as a PCI Express bus or another third generation I/O interconnect bus.

As shown in FIG. 7, various I/O devices 714 may be coupled to first bus 716, along with a bus bridge 718 which couples first bus 716 to a second bus 720. In one embodiment, second bus 720 may be a low pin count (LPC) bus. Various devices may be coupled to second bus 720 including, for example, a keyboard and/or mouse 722, communication devices 727 and a storage unit 728 such as a disk drive or other mass storage device which may include instructions/code and data 730, in one embodiment. Further, an audio I/O 724 may be coupled to second bus 720. Note that other architectures are possible. For example, instead of the point-to-point architecture of FIG. 7, a system may implement a multi-drop bus or other such architecture.

Figure 8:
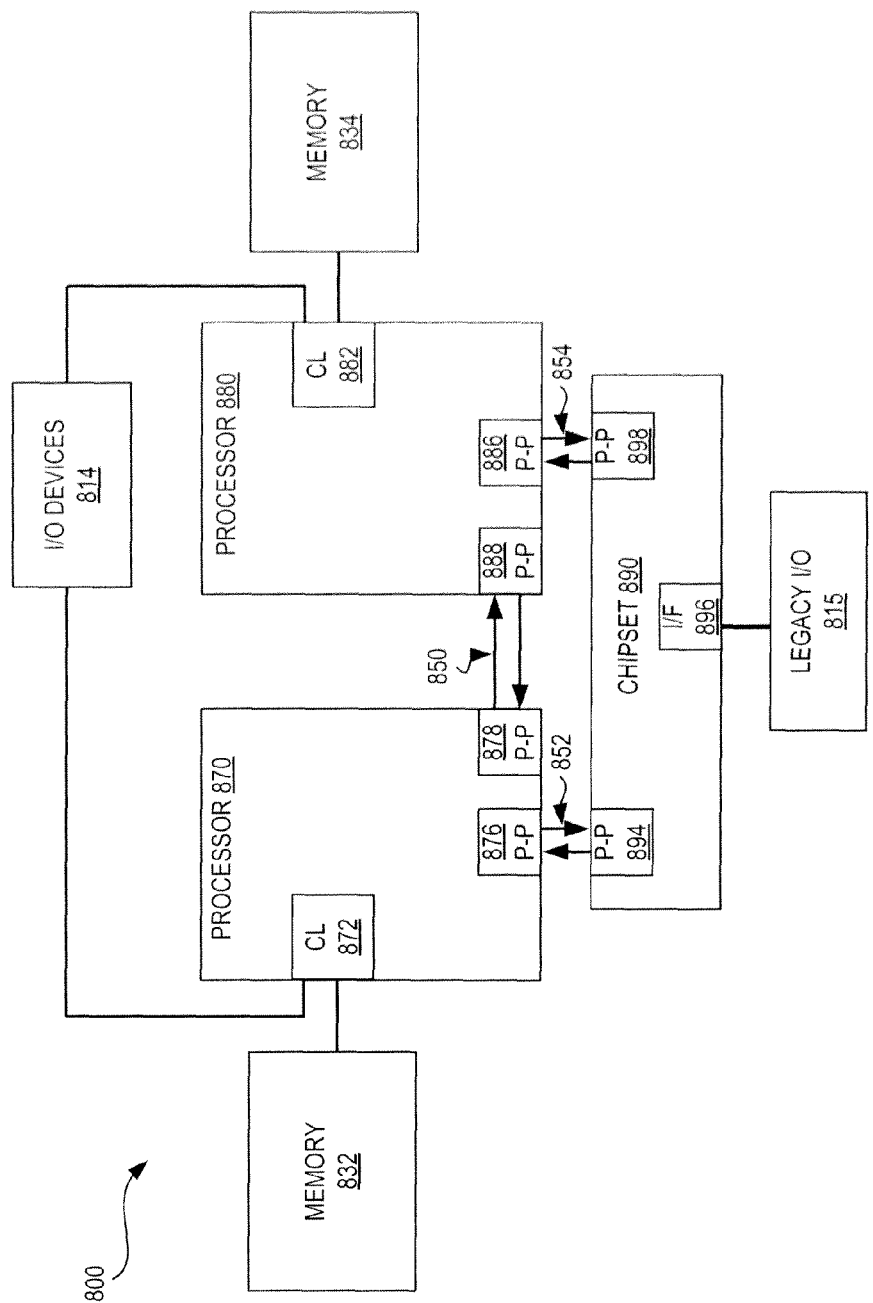
FIG. 8 is a block diagram of a computer system in accordance with one embodiment.

FIG. 8 is a block diagram of a computer system in accordance with one embodiment. In particular, a block diagram of a system 800 is depicted in accordance with an embodiment in which processors 870, 880 may include integrated memory and I/O control logic ("CL") 872 and 882, respectively and intercommunicate with each other via point-to-point interconnect 850 between point-to-point (P-P) interfaces 878 and 888 respectively. Processors 870, 880 each communicate with chipset 890 via point-to-point interconnects 852 and 854 through the respective P-P interfaces 876 to 894 and 886 to 898 as shown. For at least one embodiment, the CL 872, 882 may include integrated memory controller units. CLs 872, 882 may include I/O control logic. As depicted, memories 832, 834 coupled to CLs 872, 882 and I/O devices 814 are also coupled to the control logic 872, 882. Legacy I/O devices 815 are coupled to the chipset 890 via interface 896.

Figure 9:
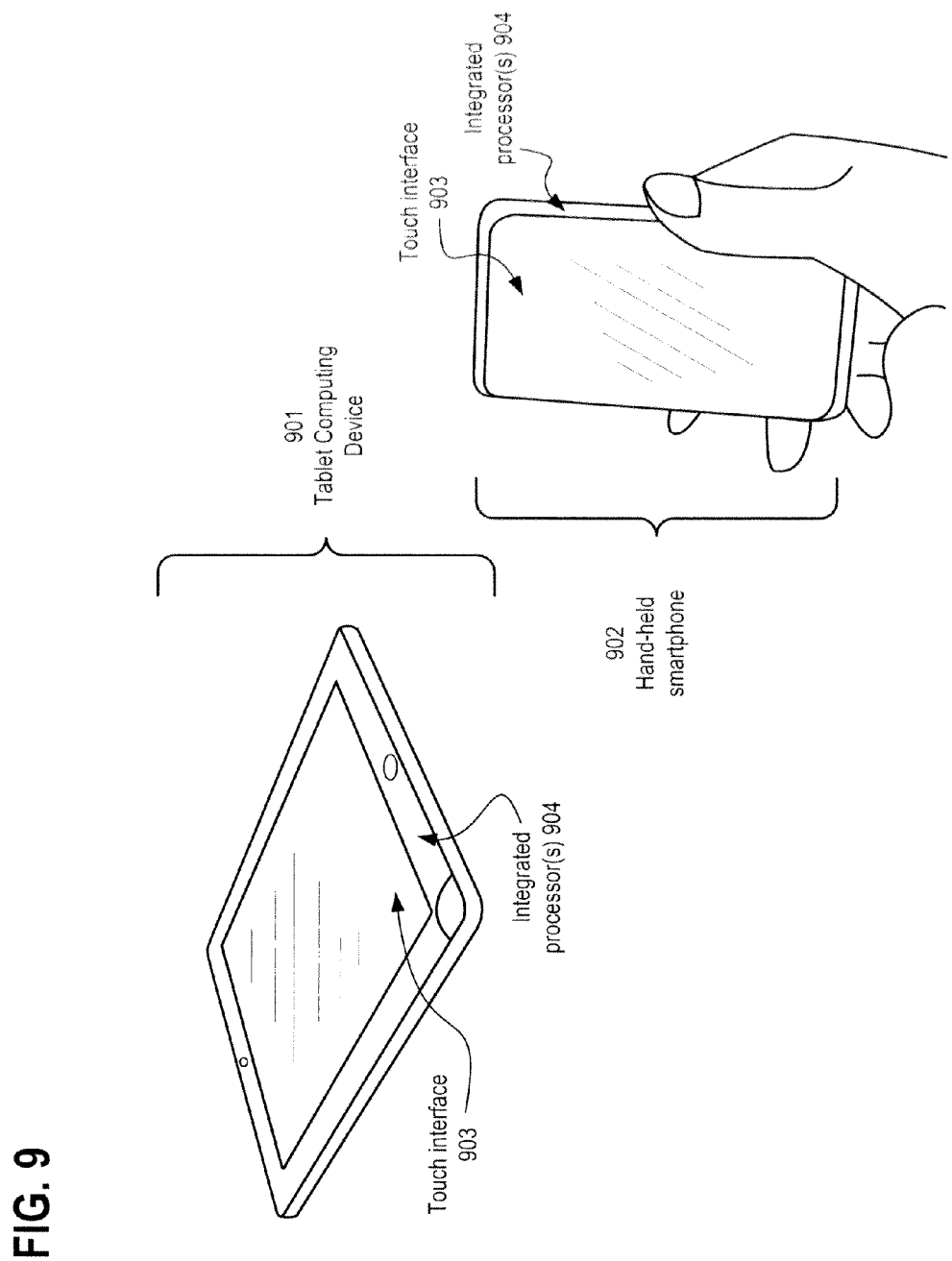
FIG. 9 depicts a tablet computing device and a hand-held smartphone each having a circuitry integrated therein as described in accordance with the embodiments.

FIG. 9 depicts a tablet computing device 901 and a hand-held smartphone 902 each having a circuitry integrated therein as described in accordance with the embodiments. As depicted, each of the tablet computing device 901 and the hand-held smartphone 902 include a touch interface 903 and one or more integrated processors 904 in accordance with disclosed embodiments.

In one embodiment, the GPU 100 is a Graphics Processor Unit type microprocessor within a tablet computing device or a smart phone or one of a plurality of integrated processors 904 within the tablet computing device 901 or a hand-held smart phone 902. For example, the GPU 100 based integrated processor 904 of a tablet computing device 901 or a hand-held smartphone 902 may implement a GPU based address translation service utilizing a lookup table within graphics memory of the GPU as described herein.

In one embodiment, tablet computing device 901 or the hand-held smartphone 902 includes a separate and distinct central processing unit communicatively interfaced with the GPU 100 within tablet computing device 901 or a hand-held smartphone 902 in which the central processing unit lacks dedicated hardware circuitry to perform address translation of guest physical addresses to machine physical addresses and must therefore rely upon GPU 100 which implements address translation services.

Figure 10:
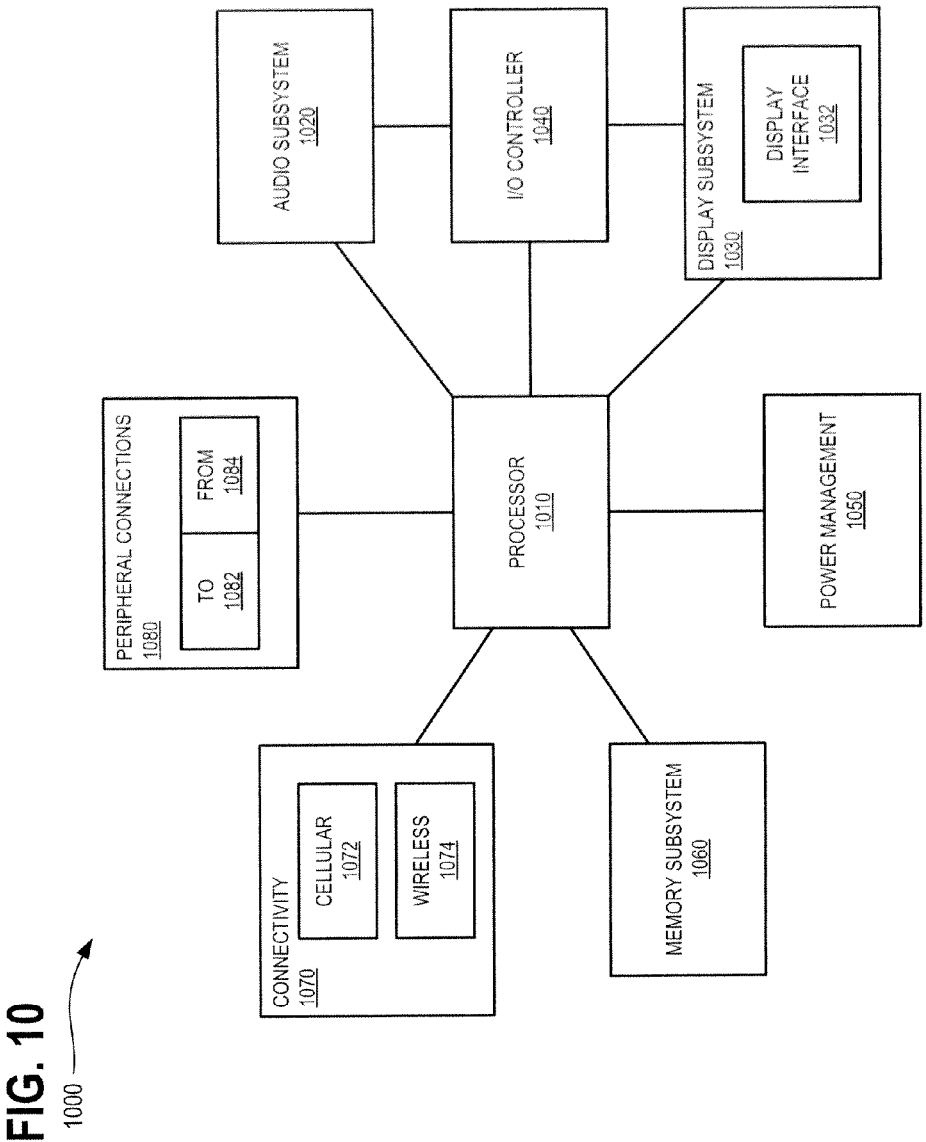
FIG. 10 is a block diagram of an embodiment of tablet computing device, a smart phone, or other mobile device in which touchscreen interface connectors are used.

FIG. 10 is a block diagram 1000 of an embodiment of tablet computing device, a smart phone, or other mobile device in which touchscreen interface connectors are used. Processor 1010 performs the primary processing operations. Audio subsystem 1020 represents hardware (e.g., audio hardware and audio circuits) and software (e.g., drivers, codecs) components associated with providing audio functions to the computing device. In one embodiment, a user interacts with the tablet computing device or smart phone by providing audio commands that are received and processed by processor 1010.

Display subsystem 1030 represents hardware (e.g., display devices) and software (e.g., drivers) components that provide a visual and/or tactile display for a user to interact with the tablet computing device or smart phone. Display subsystem 1030 includes display interface 1032, which includes the particular screen or hardware device used to provide a display to a user. In one embodiment, display subsystem 1030 includes a touchscreen device that provides both output and input to a user.

I/O controller 1040 represents hardware devices and software components related to interaction with a user. I/O controller 1040 can operate to manage hardware that is part of audio subsystem 1020 and/or display subsystem 1030. Additionally, I/O controller 1040 illustrates a connection point for additional devices that connect to the tablet computing device or smart phone through which a user might interact. In one embodiment, I/O controller 1040 manages devices such as accelerometers, cameras, light sensors or other environmental sensors, or other hardware that can be included in the tablet computing device or smart phone. The input can be part of direct user interaction, as well as providing environmental input to the tablet computing device or smart phone.

In one embodiment, the tablet computing device or smart phone includes power management 1050 that manages battery power usage, charging of the battery, and features related to power saving operation. Memory subsystem 1060 includes memory devices for storing information in the tablet computing device or smart phone. Connectivity 1070 includes hardware devices (e.g., wireless and/or wired connectors and communication hardware) and software components (e.g., drivers, protocol stacks) to the tablet computing device or smart phone to communicate with external devices. Cellular connectivity 1072 may include, for example, wireless carriers such as GSM (global system for mobile communications), CDMA (code division multiple access), TDM (time division multiplexing), or other cellular service standards). Wireless connectivity 1074 may include, for example, activity that is not cellular, such as personal area networks (e.g., Bluetooth), local area networks (e.g., WiFi), and/or wide area networks (e.g., WiMax), or other wireless communication.

Peripheral connections 1080 include hardware interfaces and connectors, as well as software components (e.g., drivers, protocol stacks) to make peripheral connections as a peripheral device ("to" 1082) to other computing devices, as well as have peripheral devices ("from" 1084) connected to the tablet computing device or smart phone, including, for example, a "docking" connector to connect with other computing devices. Peripheral connections 1080 include common or standards-based connectors, such as a Universal Serial Bus (USB) connector, DisplayPort including MiniDisplayPort (MDP), High Definition Multimedia Interface (HDMI), Firewire, etc.

Figure 11:
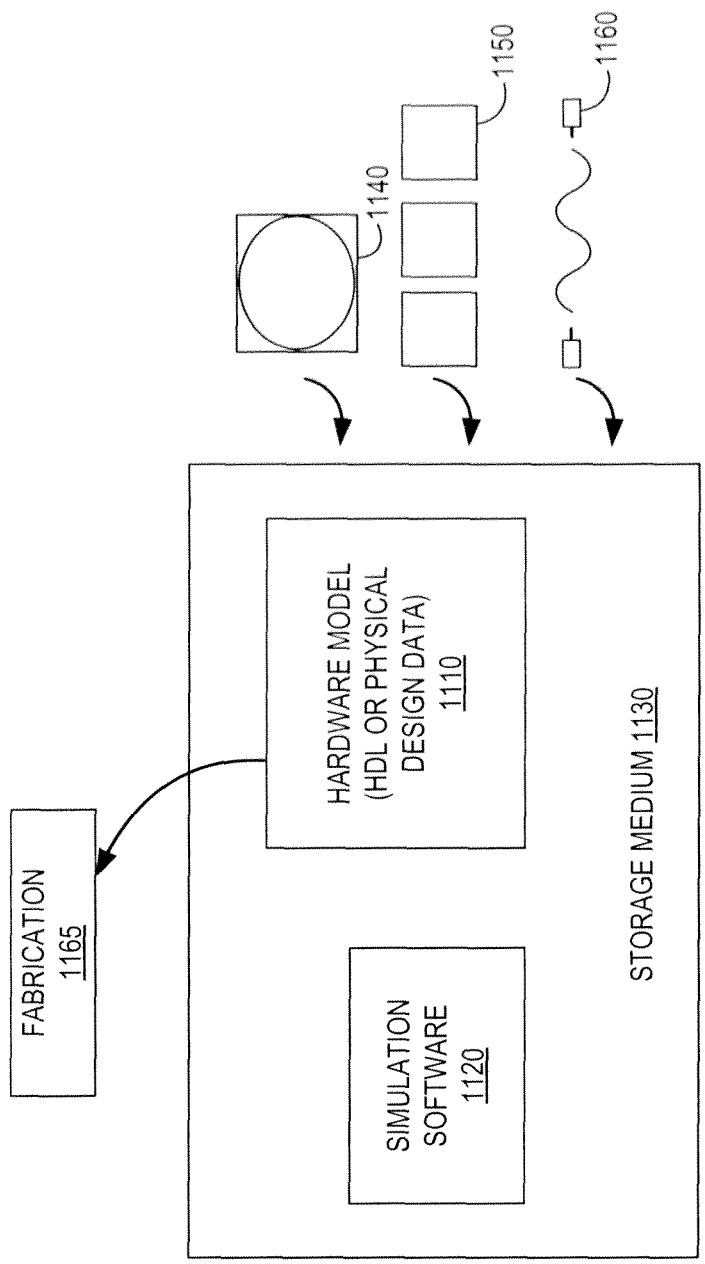
FIG. 11 is a block diagram of an IP core development system in accordance with one embodiment.

FIG. 11 is a block diagram of an IP core development system in accordance with one embodiment. In particular, a block diagram illustrates the development of IP cores according to one embodiment in which storage medium 1130 includes simulation software 1120 and/or hardware or software model 1110. In one embodiment, the data representing the IP core design can be provided to the storage medium 1130 via memory 1140 (e.g., hard disk), wired connection (e.g., internet) 1150 or wireless connection 1160. The IP core information generated by the simulation tool and model can then be transmitted to a fabrication facility 1165 where it can be fabricated by a 3rd party to perform at least one instruction in accordance with at least one embodiment.

In some embodiments, one or more instructions may correspond to a first type or architecture (e.g., x86) and be translated or emulated on a processor of a different type or architecture (e.g., ARM). An instruction, according to one embodiment, may therefore be performed on any processor or processor type, including ARM, x86, MIPS, a GPU, or other processor type or architecture.

Figure 12:
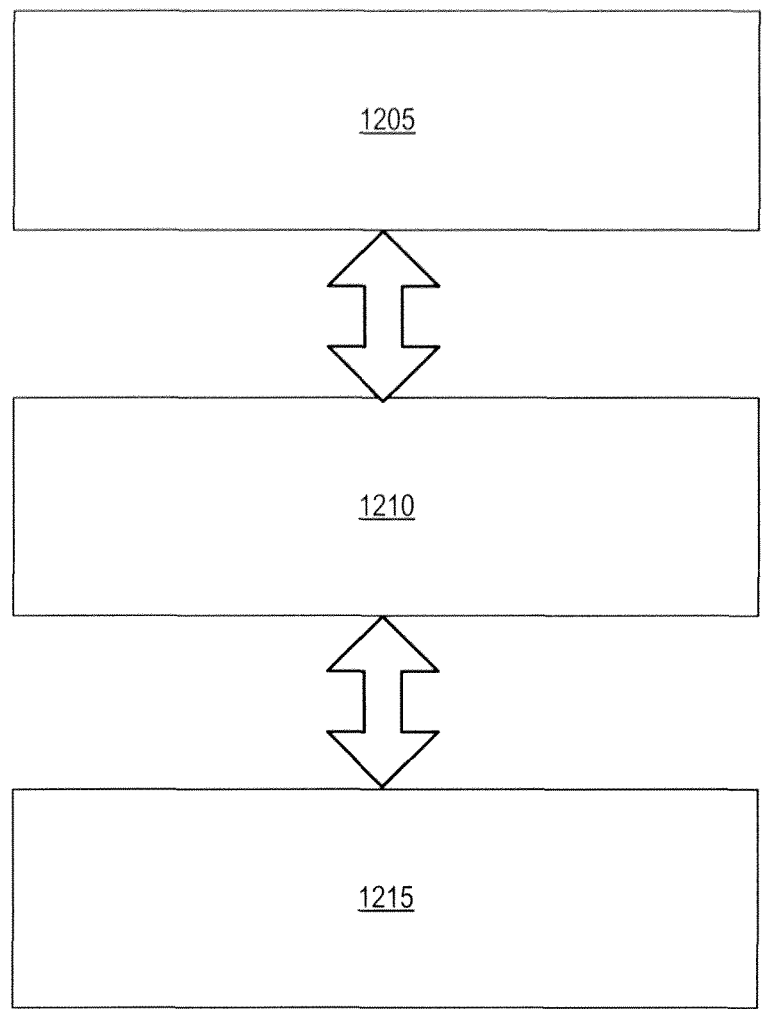
FIG. 12 illustrates an architecture emulation system in accordance with one embodiment.

FIG. 12 illustrates an architecture emulation system in accordance with one embodiment. In particular, the architecture emulation system illustrates how an instruction of a first type is emulated by a processor of a different type, according to one embodiment in which program 1205 contains some instructions that may perform the same or substantially the same function as an instruction according to one embodiment. However the instructions of program 1205 may be of a type and/or format that is different or incompatible with processor 1215, meaning the instructions of the type in program 1205 may not be able to execute natively by the processor 1215. However, with the help of emulation logic, 1210, the instructions of program 1205 are translated into instructions that are natively capable of being executed by the processor 1215. In one embodiment, the emulation logic is embodied in hardware. In another embodiment, the emulation logic is embodied in a tangible, machine-readable medium containing software to translate instructions of the type in the program 1205 into the type natively executable by the processor 1215. In other embodiments, emulation logic is a combination of fixed-function or programmable hardware and a program stored on a tangible, machine-readable medium. In one embodiment, the processor contains the emulation logic, whereas in other embodiments, the emulation logic exists outside of the processor and is provided by a third party. In one embodiment, the processor is capable of loading the emulation logic embodied in a tangible, machine-readable medium containing software by executing microcode or firmware contained in or associated with the processor.

FIG. 13 illustrates a system to translate instructions in accordance with one embodiment. In particular, a block diagram contrasting the use of a software instruction converter to convert binary instructions in a source instruction set to binary instructions in a target instruction set according to embodiments in which the instruction converter is a software instruction converter, although alternatively the instruction converter may be implemented in software, firmware, hardware, or various combinations thereof. A program in a high level language 1302 may be compiled using an x86 compiler 1304 to generate x86 binary code 1306 that may be natively executed by a processor with at least one x86 instruction set core 1316. The processor with at least one x86 instruction set core 1316 represents any processor that can perform substantially the same functions as a Intel processor with at least one x86 instruction set core by compatibly executing or otherwise processing (1) a substantial portion of the instruction set of the Intel x86 instruction set core or (2) object code versions of applications or other software targeted to run on an Intel processor with at least one x86 instruction set core, in order to achieve substantially the same result as an Intel processor with at least one x86 instruction set core. The x86 compiler 1304 represents a compiler that is operable to generate x86 binary code 1306 (e.g., object code) that can, with or without additional linkage processing, be executed on the processor with at least one x86 instruction set core 1316. Similarly, the program in the high level language 1302 may be compiled using an alternative instruction set compiler 1308 to generate alternative instruction set binary code 1310 that may be natively executed by a processor without at least one x86 instruction set core 1314 (e.g., a processor with cores that execute the MIPS instruction set and/or that execute the ARM instruction set). The instruction converter 1312 is used to convert the x86 binary code 1306 into code that may be natively executed by the processor without an x86 instruction set core 1314. This converted code is not likely to be the same as the alternative instruction set binary code 1310 because an instruction converter capable of this is difficult to make; however, the converted code will accomplish the general operation and be made up of instructions from the alternative instruction set. Thus, the instruction converter 1312 represents software, firmware, hardware, or a combination thereof that, through emulation, simulation or any other process, allows a processor or other electronic device that does not have an x86 instruction set processor or core to execute the x86 binary code 1306.

While the subject matter disclosed herein has been described by way of example and in terms of the specific embodiments, it is to be understood that the claimed embodiments are not limited to the explicitly enumerated embodiments disclosed. To the contrary, the disclosure is intended to cover various modifications and similar arrangements as would be apparent to those skilled in the art. Therefore, the scope of the appended claims should be accorded the broadest interpretation so as to encompass all such modifications and similar arrangements. It is to be understood that the above description is intended to be illustrative, and not restrictive. Many other embodiments will be apparent to those of skill in the art upon reading and understanding the above description. The scope of the disclosed subject matter is therefore to be determined in reference to the appended claims, along with the full scope of equivalents to which such claims are entitled.

What is claimed is:

1. A system comprising:
   a main memory having a plurality of machine physical addresses and to store a hypervisor;
   a processor to execute the stored hypervisor;
   a graphics processor unit having graphics memory therein;
   an address translation service integrated with the graphics processor unit, wherein the address translation service of the graphics processor unit to translate a guest physical address for one of the one or more guest machines to a corresponding machine physical address within the main memory using a lookup table;
   wherein the hypervisor to manage one or more guest machines, configure the lookup table within the graphics memory of the graphics processor unit, and
   engage the address translation service of the graphics processor unit by:
       configuring one or more graphics virtualization registers to inform the graphics processor unit that one of the guest machines have been assigned to the graphics processor unit by the hypervisor; and
       passing a Guest physical Frame Number (GFN) to the graphics processor unit for translation by the address translation service to a Machine Frame Number (MFN), wherein the GFN represents the guest physical address for one of the one or more guest machines and wherein the MFN represents the machine physical addresses within the main memory corresponding to the guest physical address.

2. The system of claim 1, further comprising:
   one or more graphics virtualization registers;
   wherein the one or more graphics virtualization registers inform the graphics processor unit that one of the guest machines have been assigned to the graphics processor unit by the hypervisor.

3. The system of claim 2, wherein the one or more graphics virtualization registers further identify where the lookup table is located for the assigned guest machine.

4. The system of claim 1, further comprising:
   a graphics virtualization determination component integrated within the graphics processor unit;
   wherein the graphics virtualization determination component is to determine whether or not the graphics processor unit is operating within a virtualization environment on behalf of one of the guest machines;
   wherein the graphics processor unit to engage the address translation service when operating within the virtualization environment; and
   wherein the system to implement logical memory address to guest physical address translation without engaging the address translation service of the graphics processor unit when the graphics processor unit is not operating within the virtualization environment.

5. The system of claim 1, wherein:
   the address translation service integrated with the graphics processor unit retrieves Guest physical Frame Number (GFN) to Machine Frame Number (MFN) mappings from the lookup table in the graphics memory.

6. The system of claim 5, wherein:
   the address translation service retrieves the GFN to MFN mappings through a Translation Lookaside Buffer (TLB) integrated within the graphics processor unit; and
   wherein the TLB provides an indexable cache on behalf of the address translation service of the graphics processor unit.

7. The system of claim 1:
   wherein the hypervisor comprises a virtual machine manager; and
   wherein the one or more guest machines comprise one or more virtual machines.

8. The system of claim 1, further comprising:
   a separate and distinct central processor unit communicably interfaced with the graphics processor unit via a system bus;
   wherein the central processing unit lacks dedicated hardware circuitry to perform address translation of guest physical addresses to machine physical addresses.

9. The system of claim 1, wherein the graphics processor unit comprises a silicon integrated circuit type graphics processor unit.

10. The system of claim 1, wherein the graphics processor unit comprises a microprocessor within a tablet computing device or a smart phone or one of a plurality of microprocessors integrated within the tablet computing device or the smartphone.

11. The system of claim 10, wherein the tablet computing device or the smartphone comprises a separate and distinct central processing unit communicatively interfaced with the graphics processor unit within the tablet computing device or the smartphone; and
    wherein the central processing unit lacks dedicated hardware circuitry to perform address translation of guest physical addresses to machine physical addresses.

12. The system of claim 1:
    wherein the graphics memory comprises shared graphics memory; and
    wherein the hypervisor to configure the lookup table within the graphics memory of the graphics processor unit comprises the hypervisor to write the lookup table into the shared graphics memory of the graphics processor unit.

13. The system of claim 1:
wherein the hypervisor to configure the lookup table within the graphics memory of the graphics processor unit comprises the hypervisor to instruct the graphics processor unit to retrieve and store the lookup table;
wherein the graphics processor unit to issue a Direct Memory Access (DMA) request to fetch the lookup table; and
wherein the graphics processor unit to store the lookup table in the graphics memory.

14. The system of claim 1:
wherein the hypervisor to issue a lookup table update to the graphics processor unit; and
wherein the graphics processor unit to responsively update the lookup table in the graphics memory.

15. A computer-implemented method comprising:
managing one or more guest machines on a system;
configuring a lookup table with a mapping of guest physical addresses for the one or more guest machines to corresponding machine physical addresses;
transferring the lookup table to a graphics memory of a graphics processor unit;
receiving an access request to a main memory of the system from one of the guest machines, wherein the access request specifies a guest physical address;
engaging an address translation service internal to the graphics processor unit by passing the guest physical address to the graphics processor unit; and
translating, via the address translation service of the graphics processor unit, the guest physical address to a corresponding machine physical address.

16. The computer-implemented method of claim 15, wherein the graphics processor unit comprises one or more graphics virtualization registers;
wherein the hypervisor configures the one or more graphics virtualization registers to inform the graphics processor unit that one of the guest machines have been assigned to the graphics processor unit by the hypervisor; and
wherein the one or more graphics virtualization registers further identify where the lookup table is located for the assigned guest machine.

17. The computer-implemented method of claim 16, further comprising:
passing a Guest physical Frame Number (GFN) from the hypervisor to the graphics processor unit requesting translation of the GFN by the address translation service to a Machine Frame Number (MFN), wherein the GFN represents the guest physical address for one of the one or more guest machines and wherein the MFN represents the machine physical addresses within the main memory corresponding to the guest physical address specified by the access request.

18. The computer-implemented method of claim 15, wherein translating the guest physical address to a corresponding machine physical address comprises the address translation service of the graphics processor unit performing the translating based on a Guest physical Frame Number (GFN) to Machine Frame Number (MFN) mapping from the lookup table in the graphics memory.

19. The computer-implemented method of claim 18, wherein:
the address translation service retrieves the GFN to MFN mapping through a Translation Lookaside Buffer (TLB) integrated within the graphics processor unit; and
wherein the TLB provides an indexable cache on behalf of the address translation service of the graphics processor unit.

20. The computer-implemented method of claim 15, wherein the graphics processor unit comprises a graphics virtualization determination component;
determining, via the graphics virtualization determination component, whether or not the graphics processor unit is operating within a virtualization environment on behalf of one of the guest machines;
engaging the address translation service for guest physical addresses associated with the graphics processor unit operating within the virtualization environment; and
bypassing the address translation service for logical addresses which are not associated with the graphics processor unit operating within the virtualization environment, wherein the system to implement logical memory address to guest physical address translation without engaging the address translation service of the graphics processor unit to translate the logical addresses.

21. The computer-implemented method of claim 15, further comprising:
enabling virtualization in the graphics processor unit by communicating a configuration request from the hypervisor to the graphics processor unit;
preparing the lookup table internal to the hypervisor; and
wherein transferring the lookup table to the graphics memory of the graphics processor unit comprises the hypervisor transferring the prepared lookup table to the graphics processor unit.

22. The computer-implemented method of claim 21, wherein the hypervisor transferring the prepared lookup table to the graphics processor unit comprises the hypervisor writing the lookup table into shared graphics memory of the graphics processor unit.

23. The computer-implemented method of claim 21, wherein the hypervisor transferring the prepared lookup table to the graphics processor unit comprises:
the hypervisor instructing the graphics processor unit to retrieve and store the prepared lookup table;
the graphics processor unit responsively issuing a Direct Memory Access (DMA) request to fetch the prepared lookup table; and
the graphics processor unit responsively storing the lookup table in graphics memory internal to the graphics processor unit.

24. The computer-implemented method of claim 15, further comprising:
the hypervisor issuing a lookup table update to the graphics processor unit; and
the graphics processor unit responsively updating the lookup table in the graphics memory.

25. The computer-implemented method of claim 15, wherein the graphics processor unit comprises a microprocessor within a tablet computing device or a smart phone or one of a plurality of microprocessors integrated within the tablet computing device or the smartphone.

26. A graphics processor unit embodied within a silicon integrated circuit, the graphics processor unit comprising:
a shared graphics memory interface to receive a prepared lookup table;
a graphics memory to store the prepared lookup table therein, wherein the prepared lookup table to store a Guest physical Frame Number (GFN) to Machine Frame Number (MFN) mapping;

an address translation service unit to receive a Guest physical Frame Number for translation; and a Translation Lookaside Buffer (TLB) to retrieve a Machine Frame Number corresponding to the received Guest physical Frame Number from the prepared lookup table to fulfill the translation.

27. The graphics processor unit of claim 26:

wherein the graphics processor unit to perform address translation services on behalf of one or more guest machines operating within a tablet computing device or a smartphone;

wherein the tablet computing device or the smartphone comprises a separate and distinct central processing unit communicatively interfaced with the graphics processor unit within the tablet computing device or the smartphone; and wherein the central processing unit lacks dedicated hardware circuitry to perform address translation of guest physical addresses to machine physical addresses.

28. The graphics processor unit of claim 26, further comprising:

one or more graphics virtualization registers;

wherein the one or more graphics virtualization registers inform the graphics processor unit that a guest machine has been assigned to the graphics processor.

29. The graphics processor unit of claim 28, wherein the one or more graphics virtualization registers further identify where the lookup table is located for the assigned guest machine.

30. The graphics processor unit of claim 26, further comprising:

a graphics virtualization determination component integrated within the graphics processor unit;

wherein the graphics virtualization determination component is to determine whether or not the graphics processor unit is operating within a virtualization environment on behalf of one or more guest machines; and wherein the graphics processor unit to engage the address translation service when operating within the virtualization environment.

* * * * *